United States Patent
Wu et al.

(10) Patent No.: US 12,341,971 B2
(45) Date of Patent: Jun. 24, 2025

(54) PREDICTIVE VIDEO CODING EMPLOYING VIRTUAL REFERENCE FRAMES GENERATED BY DIRECT MV PROJECTION (DMVP)

(71) Applicant: APPLE INC., Cupertino, CA (US)

(72) Inventors: Yeqing Wu, Cupertino, CA (US); Yunfei Zheng, Santa Clara, CA (US); Alexandros Tourapis, Los Gatos, CA (US); Alican Nalci, Cupertino, CA (US); Yixin Du, Milpitas, CA (US); Hilmi Enes Egilmez, Santa Clara, CA (US); Albert E. Keinath, Sunnyvale, CA (US); Jun Xin, San Jose, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 190 days.

(21) Appl. No.: 18/157,360

(22) Filed: Jan. 20, 2023

(65) Prior Publication Data

US 2023/0300341 A1    Sep. 21, 2023

Related U.S. Application Data

(60) Provisional application No. 63/305,111, filed on Jan. 31, 2022, provisional application No. 63/331,469, filed on Apr. 15, 2022.

(51) Int. Cl.
*H04N 19/139*   (2014.01)
*H04N 19/176*   (2014.01)

(52) U.S. Cl.
CPC ......... *H04N 19/139* (2014.11); *H04N 19/176* (2014.11)

(58) Field of Classification Search
CPC .... H04N 19/139; H04N 19/176; H04N 19/61; H04N 19/70; H04N 19/577
See application file for complete search history.

(56) References Cited

U.S. PATENT DOCUMENTS

| | | | |
|---|---|---|---|
| 2002/0071485 A1* | 6/2002 | Caglar | H04N 19/34 375/E7.091 |
| 2018/0098062 A1 | 4/2018 | Li et al. | |
| 2019/0124350 A1 | 4/2019 | Thirumalai et al. | |

(Continued)

FOREIGN PATENT DOCUMENTS

WO    WO 2003/085990 A2    10/2003

OTHER PUBLICATIONS

Barron et al.; "Performance of Optical Flow Techniques"; Int'l Journal of Computer Vision; 1994; p. 43-77.

(Continued)

*Primary Examiner* — Farzana Hossain
(74) *Attorney, Agent, or Firm* — BakerHostetler

(57) ABSTRACT

Techniques are disclosed for generating virtual reference frames that may be used for prediction of input video frames. The virtual reference frames may be derived from already-coded reference frames and thereby incur reduced signaling overhead. Moreover, signaling of virtual reference frames may be avoided until an encoder selects the virtual reference frame as a prediction reference for a current frame. In this manner, the techniques proposed herein contribute to improved coding efficiencies.

26 Claims, 18 Drawing Sheets

(56) References Cited

U.S. PATENT DOCUMENTS

2023/0007272 A1* 1/2023 Tourapis ............... H04N 19/52

OTHER PUBLICATIONS

Lu et al.; "Optical Flow Motion Vector Refinement for AV2"; Document: CWG-B041 v3; Alliance for Open Media—Codec Work Group; Sep. 2021; 11 pages.

International Patent Application No. PCT/US2023/060983; Int'l Written Opinion and Search Report; dated Jun. 30, 2023; 21 pages.

Zhao et al.; "Enhanced Motion-Compensated Video Coding With Deep Virtual Reference Frame Generation"; IEEE Transactions on Image Processing; vol. 28; Oct. 2019; p. 4832-4844.

Liu et al.; "Direct Mode Coding for B Pictures using Virtual Reference Picture"; IEEE Int'l Conf. on Multimedia and Expo; 2007 p. 1363-1366.

International Patent Application No. PCT/US2023/060983; Int'l Preliminary Report on Patentability; dated Aug. 15, 2024; 33 pages.

* cited by examiner

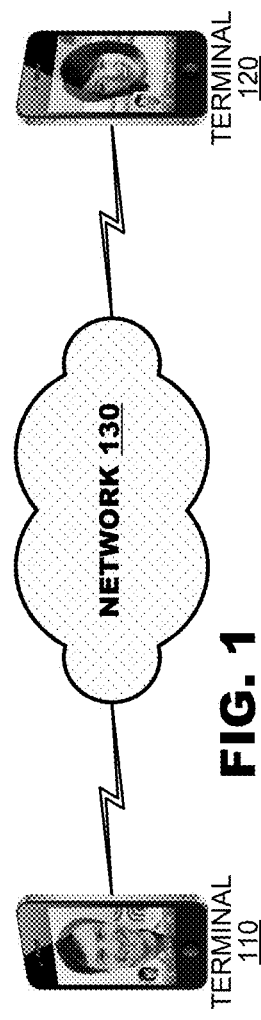
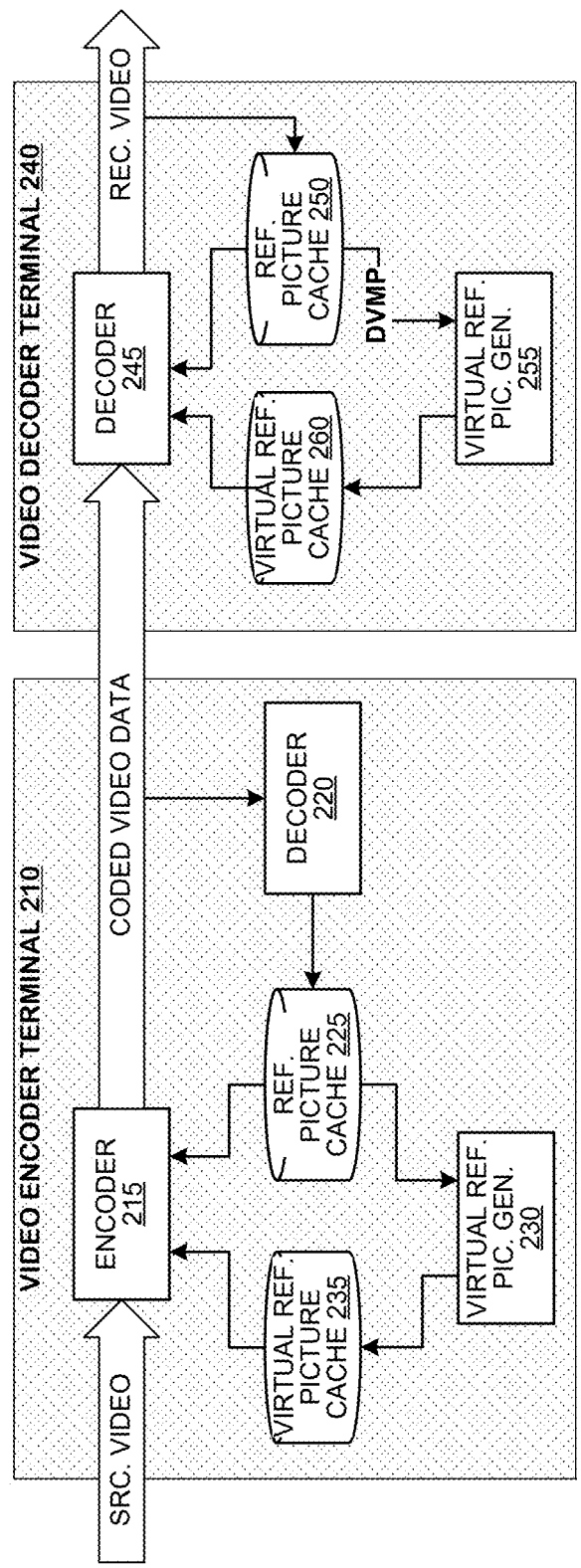
FIG. 1
100
FIG. 2
200

300

400

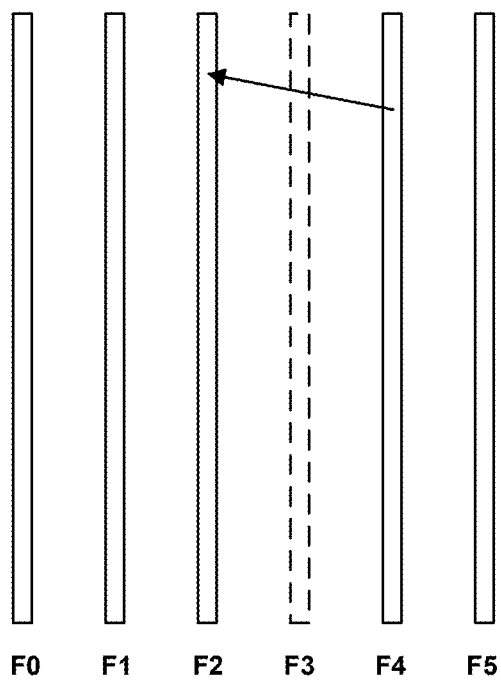 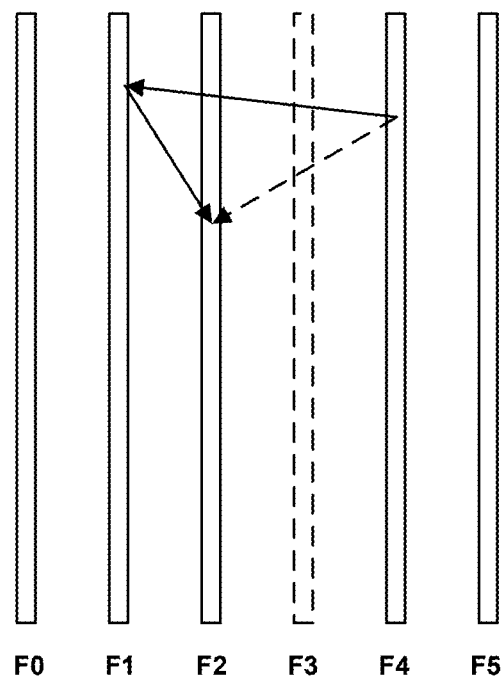
FIG. 5(a)
500
FIG. 5(b)
500
(a) Direct MV between F2 and F4
(b) Indirect MV between F2 and F4 obtained from temporal derivation

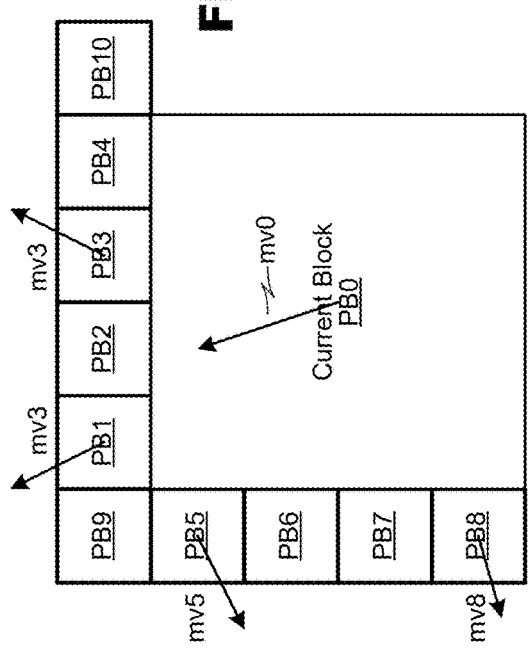
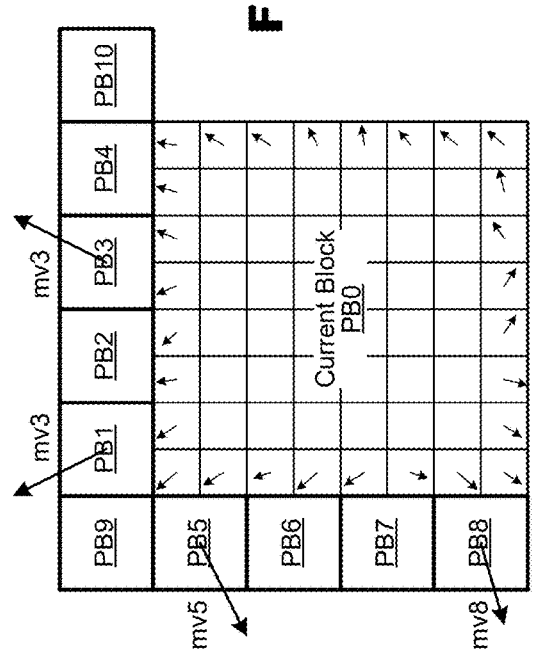
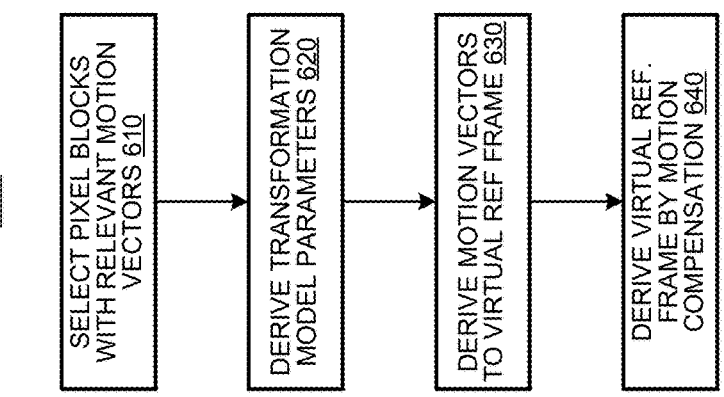

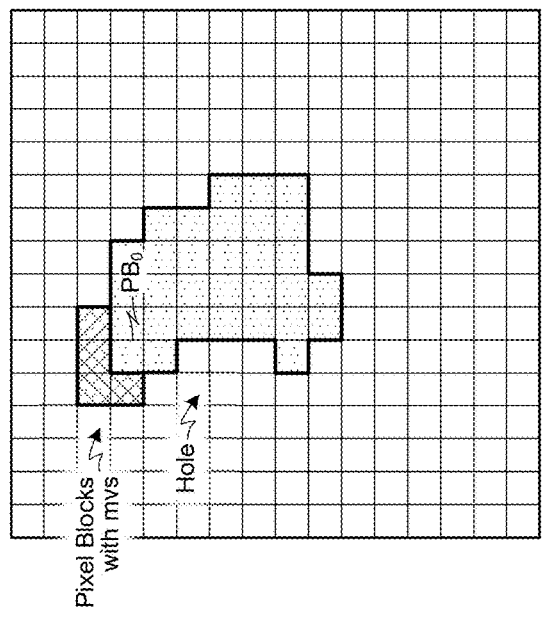
FIG. 9
900
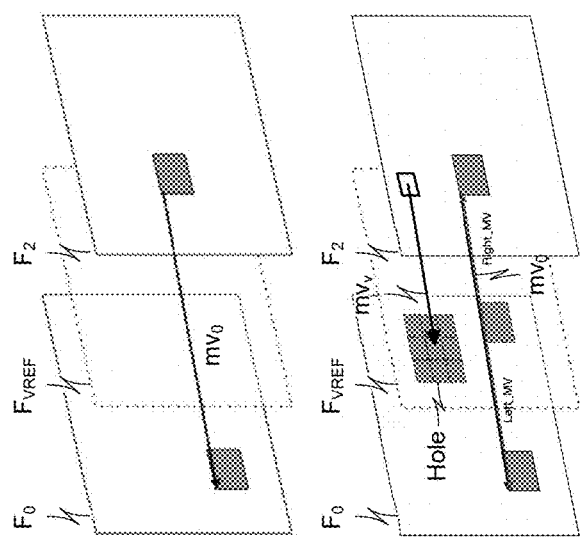
FIG. 8(a)
800
FIG. 8(b)
800
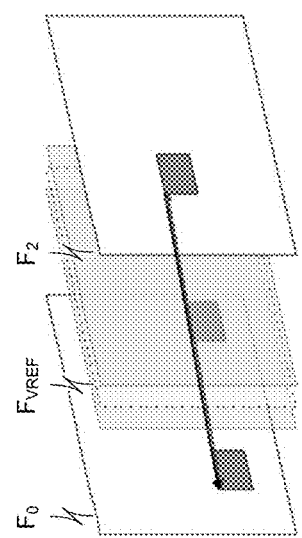
FIG. 10
1000

1100

1100

1200

1200

1300

1300

1400

1400

1500

1600

1800

1900

2000

2100

2200

2300

PREDICTIVE VIDEO CODING EMPLOYING VIRTUAL REFERENCE FRAMES GENERATED BY DIRECT MV PROJECTION (DMVP)

CROSS REFERENCE TO RELATED APPLICATIONS

This application claims benefit under 35 U.S.C. § 119(e) of U.S. patent application No. 63/305,111, filed Jan. 31, 2022, and U.S. patent application No. 63/331,469, filed Apr. 15, 2022, the contents of which are incorporated herein by reference in their entirety.

BACKGROUND

The present disclosure is directed to video coding and, in particular, to video coding that employ predictive coding techniques.

In many video applications, strong temporal correlation may exist in between successive frames. This is especially true when pictures in a video sequence are sampled densely (e.g., captured quickly) and the temporal distance between two successively-sampled frames is short. To remove temporal redundancy and to improve video compression efficiency, existing video coding systems and standards often utilize "motion compensated prediction," which codes content of one frame (a "current" frame) by searching for matching content in previously-coded frame(s). Many coding systems adhere to publicized coding standards. For complexity and implementation purposes, many standards utilize rectangular blocks of varying size for prediction. Such blocks (called "pixel blocks" for convenience) may be organized using flexible and adaptive tree structures, e.g. binary, ternary, and quad-tree structures or their combinations, for efficient coding.

Several strategies for prediction have been explored. Inter prediction (including Uni-directional, Bi-directional, Bi-predictive prediction, and multi-hypothesis prediction), for example, exploits temporal correlation of previously encoded frames (commonly referred to as "reference frames") and the current frame. An encoder may perform a motion search on the available reference frames to find one or more matching block that can best predict a block in the current frame. Such block is commonly referred to as an inter prediction hypothesis. In most coding standards and coding systems up to two such hypotheses from these reference frames can be blended together to form the final prediction for the current block. Inter prediction can largely remove temporal correlation and redundancies between the reference frames and the current frame and can make encoding of the current frame less costly/more efficient compared to the use of intra prediction methods. However, these techniques often incur significant signaling overhead that can reduce coding efficiency.

BRIEF DESCRIPTION OF THE DRAWINGS

FIG. 1 is a block diagram of a video coding system according to an embodiment of the present disclosure.

FIG. 2 is a functional diagram of a video coding system according to an embodiment of the present invention.

FIGS. 5(a) and 5(b) illustrate exemplary application of translational motion techniques for motion projection according to embodiments of the present disclosure.

FIG. 6 illustrates a method of performing affine motion vector projection according to an embodiment of the present disclosure.

FIG. 7 illustrates exemplary sets of pixel blocks on which the method of FIG. 6 may operate. Specifically, FIG. 7(a) illustrates a first relationship between a current pixel block and neighboring pixel blocks, and FIG. 7(b) illustrates a second relationship between a current pixel block and neighboring pixel blocks.

FIG. 8 illustrates a conceptual example of derivation of a virtual reference frame according to an embodiment of the present disclosure. Specifically, FIG. 8(a) illustrates a motion vector extending between two frames from which a derivation may be made, and FIG. 8(b) illustrates a hole phenomenon that may arise from such derivations.

FIG. 9 illustrates an example of a hole on which embodiments of the present disclosure may operate FIG. 10 illustrates a conceptual example of a warping process according to an embodiment of the present disclosure.

FIG. 11 illustrates application of motion vector prediction according to an embodiment of the present disclosure. Specifically.

FIG. 12 illustrates application of motion vector prediction according to another embodiment of the present disclosure. Specifically.

FIG. 13 illustrates application of motion vector prediction according to a further embodiment of the present disclosure. Specifically.

FIG. 14 illustrates application of motion vector prediction according to another embodiment of the present disclosure. Specifically.

DETAILED DESCRIPTION

Figure 3:
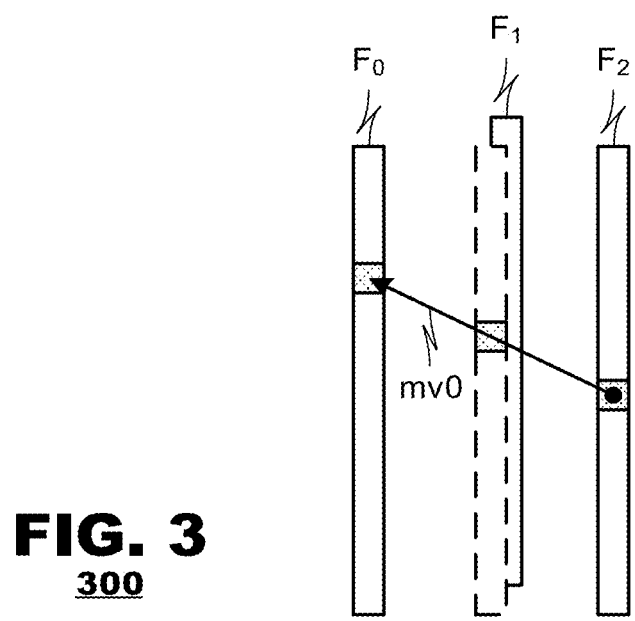
FIG. 3 illustrates an example of a virtual reference frame and its relationship to exemplary reference frames according to an embodiment of the present invention.

Embodiments of the present disclosure provide a technique for generating virtual reference frames that may be used for prediction of input video frames. The virtual reference frames may be derived from already-coded reference frames and thereby incur reduced signaling overhead. Moreover, signaling of virtual reference frames may be avoided until an encoder selects the virtual reference frame as a prediction reference for a current frame. In this manner, the techniques proposed herein contribute to improved coding efficiencies.

FIG. 1 is a block diagram of a video coding system according to an embodiment of the present disclosure. The system 100 may include a plurality of terminals 110, 120 provided in mutual communication via a network 130. The terminals 110, 120 may code video data for transmission to their counterparts via the network 130. Thus, a first terminal 110 may capture video data locally, code the video data and transmit the coded video data to the counterpart terminal 120 via the network 130. The receiving terminal 120 may receive the coded video data, decode it, and render it locally, for example, on a display at the terminal 120. If the terminals are engaged in bidirectional exchange of video data, then the terminal 120 may capture video data locally, code the video data and transmit the coded video data to the counterpart terminal 110 via the network 130. The receiving terminal 110 may receive the coded video data transmitted from terminal 120, decode it, and render it locally, for example, on its own display.

A video coding system 100 may be used in a variety of applications. In a first application, the terminals 110, 120 may support real time bidirectional exchange of coded video to establish a video conferencing session between them. In another application, a terminal 110 may code pre-produced video (for example, television or movie programming) and store the coded video for delivery to one or, often, many downloading clients (e.g., terminal 120). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

In FIG. 1, the terminals 110, 120 are illustrated as a smart phones, but the principles of the present disclosure are not so limited. Aspects of the present disclosure also find application with various types of computers (desktop, laptop, and tablet computers), computer servers, media players, gaming systems, dedicated video conferencing equipment and/or dedicated video encoding equipment.

The network 130 represents any number of networks that convey coded video data between the terminals 110, 120, including for example wireline and/or wireless communication networks. The communication network 130 may exchange data in circuit-switched or packet-switched channels. Representative networks include telecommunications networks, local area networks, wide area networks, and/or the Internet. In some applications involving unidirectional video delivery, a communication channel may be provided by storage devices (not shown) such as electrical, magnetic, and/or optical storage media. For the purposes of the present discussion, the architecture and topology of the network are immaterial to the operation of the present disclosure unless otherwise noted.

FIG. 2 is a functional diagram of a video coding system 200 according to an embodiment of the present invention. The system 200 may find application in the system 100 of FIG. 1. The system 200 may include a video encoder terminal 210 and a video decoder terminal 240. The video encoder terminal 210 may include an encoder 215, a decoder 220, a reference picture cache 225, a virtual reference picture generator 230, and a virtual reference picture cache 235. The encoder 215, as its name implies, may apply video coding techniques to source video that is input to the video encoder terminal 210 and outputs coded video data, which is supplied to the video decoder terminal 240. A decoder 220 within the video encoder terminal 210 may invert coding operations applied by the encoder 215 to coded frames selected to serve as reference frames for coding. Recovered video output from the decoder 220 may be input to a reference picture cache 225. The virtual reference picture generator 230 may generate virtual reference frames from reference frames stored in the reference picture cache 225 according to techniques discussed herein. The virtual reference frames may be stored in the virtual reference picture cache 235. Recovered frames in the reference picture cache 225 and the virtual reference picture cache 235 may be used in prediction operation performed by the encoder 215 when processing later-received source video.

The video decoder terminal 240 may include a decoder 245, a reference picture cache 250, a virtual reference picture generator 255, and a virtual reference picture cache 260. The decoder 245 may decode coded video data received from the video encoder terminal 210 and obtain recovered video data therefrom. The recovered video data may be output from the video decoder terminal 240 for use by other processes of the terminal (FIG. 1) in which the video decoder terminal 240 resides.

In application, the video encoder terminal 210 and the video decoder terminal 240 may adhere to a coding protocol that defines the coding operations that may be applied by an encoder 215 and syntactic elements that identify the coding operations that are applied Typically, an encoder 215 selects certain frames that are to be used as "reference frames," frames that may serve as prediction references for later-coded frames. When a frame is designated as a reference frame, the decoders 220 and 245 may store the frames recovered therefrom to the reference picture cache 250. Because the video encoder terminal's decoder 220 and the video decoder terminal's decoder 245 both generate recovered video from the coded video output by the encoder 215, the content of the reference picture caches 225 and 250 in both terminals should be synchronized absent some type of communication error.

The virtual reference picture generator 255 may generate virtual reference frames from reference frames stored in the reference picture cache 260 according to techniques discussed herein. The virtual reference frames may be stored in the virtual reference picture cache 260. Recovered frames in the reference picture cache 250 and the virtual reference picture cache 260 may be used in prediction operation performed by the decoder 245 as determined by coding parameters in provided in the coded video data.

FIG. 3 illustrates the virtual reference frame concept in which a virtual reference frame $F_{VREF}$ is generated from a pair of coded frames $F_0$ and $F_2$. In practice, frame processed by an encoding system may have its own temporal location that identifies the frame's position in a video timeline. In the example of FIG. 3, frames F0 and F2 each may have their own temporal locations. A virtual reference frame $F_{VREF}$ is shown being created at a temporal location that intermediate between the locations of frames F0 and F2. In the illustrated example, motion projection is utilized to generate an interpolated frame $F_{VREF}$, using motion vectors (also "MVs") that extend from frame F2 to frame F0 and, therefore, are used to predict content of frame $F_2$. In this manner, content of the virtual reference frame $F_{VREF}$ may be derived from prediction data provided to develop other recovered frames (frame F2 in the example of FIG. 3).

In practice, a virtual reference frame $F_{VREF}$ may located in a same temporal position as a frame F1 that is coded by the encoding system. It may be convenient to for an encoder 220 (FIG. 2) to code the frame F1 using the virtual reference frame $F_{VREF}$ as a prediction reference. In general, depending on the motion projection model used for the creation of the virtual reference frame $F_{VREF}$, the virtual reference frame $F_{VREF}$ is likely to be well aligned and similar with other frames (for example, frame F1 and others not shown) that have temporal locations proximate to the virtual reference frame $F_{VREF}$. This is especially true if motion is translational and the temporal distance between the virtual reference frame $F_{VREF}$ and a frame F1 being coded is small. During the coding of a frame F1, and if the co-located position in $F_{VREF}$ has similar motion, an encoder 220 (FIG. 2) may need to only signal a single spatial displacement from $F_{VREF}$ to F1 for signaling the corresponding prediction location for the current block. Thus, the proposed coding techniques can potentially improve coding efficiency by reducing bits of side information used to predict the current block. This could also be extended to when prediction is from the same direction, in which case motion projection uses extrapolation.

Figure 4:
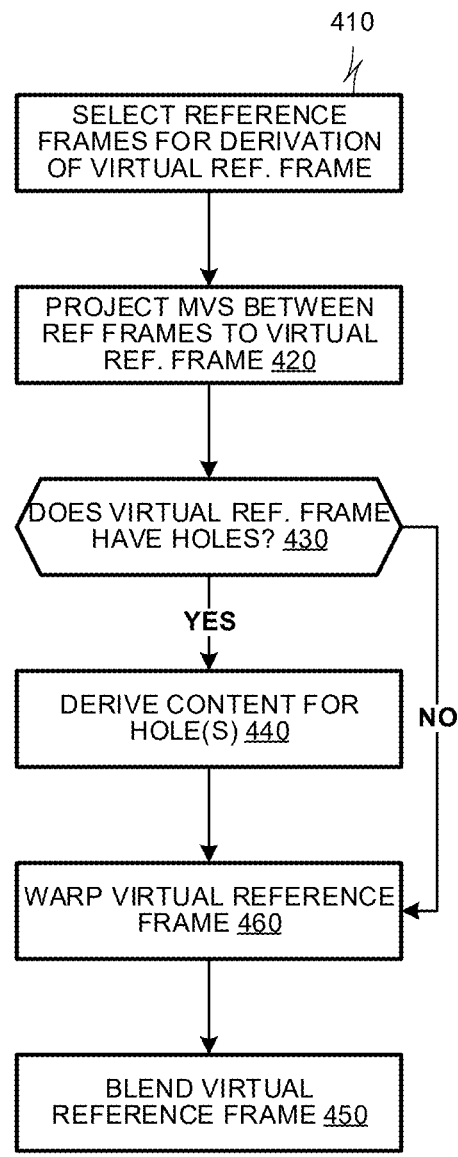
FIG. 4 illustrates a method for generating a virtual reference frame according to an embodiment of the present disclosure.

FIG. 4 illustrates a method 400 for generating a virtual reference frame according to an embodiment of the present disclosure. The method 400 may begin by selecting reference frames $F_0$, $F_2$ for derivation of the virtual reference frame (box 410). The method 400 may project motion vectors that extend between the reference frames onto the virtual reference frame (box 420). Thereafter, the method 400 may determine whether the virtual reference frame has "holes" for which the motion vector projections do not reach (box 430). If so, the method may derive content for the holes through alternative techniques (box 440). The method 400 may warp the reference frames based on the projected motion vector field created (box 450). Once projections have been made for the entire spatial area of the virtual reference frame, the method 400 may blend content of the reference frames $F_0$, $F_2$ (box 460).

Reference frames $F_0$, $F_2$ for motion projection may be selected based on evaluation of candidate reference frames' temporal distance from the temporal location of the virtual reference frame FVREF, based on whether interpolation or extrapolation would be necessary, and based on estimates of the candidate reference frames' quality (which may be evaluated on a region basis or a block pixel quality basis, or based on coding parameters (e.g., QP) used in coding the candidate reference frames. Moreover, selection of reference frames may evaluate types of motion that occur between pairs of candidate reference frames (e.g., translation, zoom, rotation, affine, etc.), motion magnitude, spatial resolution differences, spatial signal characteristics (spatial texture or smooth region), etc. and the like.

In general, when the temporal distance between two candidate reference frames is small, a strong temporal correlation between them is more likely. Selecting the frames with strong correlation can provide better prediction. Thus, the temporal distance can be a significant factor to the method 400 when selecting reference frames.

Additionally, in inter prediction, if reference frames are selected such that the temporal location of the virtual reference frame $F_{VREF}$ the coded frame is located between two reference frames (interpolation), the motion from these two reference frames usually has higher accuracy than the motion from two reference frames that are located on the same side of the current frame (extrapolation). Moreover, some frames may be coded at a higher quality compared to other frames. The reconstruction quality may also vary spatially because of adaptive quantization methods or rate control schemes. The quality level could be controlled through features/parameters of quantization, rate distortion optimized quantization, coefficient thresholding, and quantization rounding among others. Thus, the quality of the reference frames and the prediction blocks that may be used could vary. In an embodiment, reference frame selection may prioritize a reference frame coded at a higher quality than another reference frame, especially if the two have the same temporal distance to the virtual reference frame $F_{VREF}$. In general, a model that considers both the temporal distance and quality of the references may be used to select reference frames for use in derivation of a virtual reference frame $F_{VREF}$.

As discussed, types of motion may be evaluated as part of the reference frame selection process. Reference frames that are identified as having translational motion may be assigned relatively higher priority than reference frames that are identified as having occlusion or disocclusion motion may be assigned lower priority for selection than frames.

Moreover, illumination gradients may be evaluated as part of the reference frame selection process. Frames that are identified as having relatively consistent illumination may be assigned relatively higher priority for selection than reference frames that are part of video sequences having highly variable illumination. Similarly, frames that are identified has part of a video sequence with smooth illumination gradients may be assigned relatively higher priority for selection than reference frames that are part of video sequences having erratically variable illumination.

The method 400 may generate a score for each pair of candidate reference frames based on an evaluation of these factors, modeled as:

$$\text{Score} = f(\text{temporal\_distance, interpolation/extrapolation,} \quad (1)$$
$$\text{pixel\_quality, light change, occlusion/disocclusion})$$

The score may be modeled as a function $f$ of, but is not limited to, temporal distance, interpolation/extrapolation, pixel quality, light change, and occlusion/disocclusion. The function $f$ can be, but is not limited to, a linear, non-linear model, decision tree, neural network, SVM (space vector model), and the like. For error resiliency, once a priority order is decided based on the score value, an encoder terminal may signal the order to a decoder terminal explicitly. Signaling can be done at frame, tile, or slice level of a coding syntax.

Motion vector projection may be performed in several ways, such as by translational motion modeling, affine motion modeling, perspective motion modeling, and the like. The following discussion presents exemplary motion projection using translational motion and the affine motion models, respectively. Illumination compensation, i.e. weighed prediction and its associated parameters, could also be applied in a similar manner. Moreover, multi-hypothesis prediction may be applied for motion vector projection, where prediction is achieved using more than two hypotheses.

FIGS. 5(a) and 5(b) illustrate exemplary application of translational motion techniques for motion projection. In both instances, motion vectors between a pair of reference frames F2 and F4 are used to generate motion vectors for a virtual reference frame F3.

FIG. 5(a) illustrates an example of direct motion vector projection. For a pixel block PB in the reference frame F4, if it is coded as inter prediction and its motion vector my points to the other selected reference frame F2, then the motion vector my can be projected onto the current frame F3 based on the frames' temporal distances.

FIG. 5(b) illustrates an example of indirect motion vector projection. Indirect motion vector project may be used for pixel blocks in a reference frame F4 that do not motion information associated with them or for pixel blocks' whose motion information points to reference frame(s) that are different from the second reference frame F2 that is to be used for prediction of the virtual reference frame F3. In circumstances where both reference frames F2, F4 may have a common reference frame, e.g. frame F1, a motion vector $mv_v$ for the virtual reference frame F3 from a chain of motion vectors mv1, mv2 that extends between frames F4, F2, and F1. The motion vector $mv_1$ between F1 and F4, and the motion vector mv2 between F1 and F2 can be utilized to derive the motion vector $mv_v$ between frames F2 and F4. After deriving the motion vector $mv_v$ between F2 and F4, the motion vector $mv_v$ may be projected on the virtual reference frame F3 based on the temporal distance of the current frame F3 and its reference frames F2 and F4.

Direct motion vectors between reference fames can potentially result in better quality for the projected motion vector since the reference block can be searched by performing a block matching search with the current block. For a block that is not associated with direct motion vector information, indirect motion vectors can still provide reliable information to help derive projected motion vectors.

In an embodiment, a video sequence could with different kinds of motion, such as rotation, zoom in/out, scaling and other non-translational motion, may be processed by affine motion projection techniques. A global affine model can be applied to motion compensate an entire frame if the entire frame follows a single affine model. Different, locally-applicable affine models may be applied at the block level on an as-needed to adaptively track more complex motion locally.

FIG. 6 illustrates a method 600 of performing affine motion vector projection according to an embodiment of the present disclosure. The method 600 may operate with reference to a current block of a reference frame, examples of which are shown in FIGS. 7(a) and 7(b) herein. The method 700 may begin by identifying other pixel block(s) of the reference frame having relevant motion vectors (box 610). The method 600 may derive transformation model parameters from the motion vectors of the identified pixel blocks (box 620). The method 600 may derivate motion vectors to the virtual reference frame based on the model parameters (box 630). Thereafter, the method 600 may derive content of the virtual reference frame by motion compensation using the motion vectors derived in box 630.

Selection of pixel block may occur in a variety of ways. In one example, shown in FIG. 7(a), motion vectors from neighboring pixel blocks may be selected based on the reference frames to which they refer.

FIG. 7(a) illustrates an exemplary set of pixel blocks PB0-PB10 on which the method 600 of FIG. 6 may operate. As illustrated, a current pixel block PB0 being processed by the method 600 may have some number of neighboring pixel blocks PB1-PB10. Video coding systems oftentimes codes video as pixel blocks of varying sizes; therefore, the relative sizes of the pixel blocks PB0-PB10 and the number and disposition of pixel blocks PB1-PB10 that are adjacent to a current pixel block PB0 may vary based on other coding decisions made by an encoder.

The affine transformation model parameters from the reference frames can be estimated by exploiting the neighboring blocks' PB1-PB10 motion vectors mv1-mv10 at both the encoder and decoder, or can be estimated at the encoder and signaled to a decoder in the bitstream. A hybrid approach, where an initial estimate of the parameters is derived in both the encoder and the decoder and a refinement is signaled in the bitstream, also can be applied. The following discussion describes an embodiment for deriving block-based affine transformation model parameters for motion compensation of a virtual reference frame with reference to FIG. 7(a).

For example, the method may consider neighboring pixel blocks PB1-PB10, such as the pixel blocks in a row above, a column to the left, at top right, and at top left of current pixel block PB0, may be examined to find the blocks that have the same reference frame as the current block. If such blocks are found, their motion vectors may be used to derive affine model parameters.

The neighboring blocks PB1-PB10 can be scanned with a sequential order, like from left to right for the above row, and then from top to down for the left column. Alternatively, the pixel blocks can be sampled in a predesigned or a signaled pattern without having to scan all the blocks.

In a scenario that there is no block that has the same reference frame as the current block PB0 the motion vectors of these neighboring blocks PB1-PB10 that have different reference frames from the current frame can also be utilized by conducting the temporal scaling on the MVs of these neighboring blocks PB1-PB10 based on the temporal distance of the current frame F2 (FIG. 3) to the current block's reference frame F1 and the temporal distance of the current frame F2 to the neighboring blocks' reference frames (not shown in FIG. 3). Alternatively, the neighbors that use the N closest reference frames for prediction may be utilized, while again performing temporal scaling of their motion vectors. In an alternative embodiment, the neighbors PB1-PB10 could also be scanned by finding first the neighbor that utilizes the closest reference and using that to determine the value of the spatial motion vector predictor (after temporal scaling). If desired, the neighbors PB1-PB10 with the next in order/distance reference frame can be added next, until either N neighbors are added or until there are no more neighbors that use a reference frame within a distance X. Such information, i.e. how many neighbors and or the X distance, could be predetermined or signaled in the bitstream.

Taking FIG. 7(a) as an example, pixel blocks PB1, PB3, PB5, and PB8 are illustrated as using the same reference frame as the reference frame used by the current block PB0. In this case, the motion vectors mv0, mv1, mv3, mv5, and mv8 of these blocks may be utilized for affine model parameters derivation.

In embodiment, derivation of transformation model parameters may occur as follow. When a neighboring block is identified as relevant in box 610, a sample offset of the neighboring block to the current blocks may be derived. Consider a neighboring block k whose center position is $(x_k, y_k)$ and its motion vector is $mv_k$. The current block's center position is $(x_0, y_0)$ and its motion vector is $mv_0$. Then the sample position offset between the current block and its neighboring blocks can be derived as:

$$(\text{offset}_{x_k}, \text{offset}_{y_k}) = (x_k, y_k) - (x_0, y_0) \quad (2)$$

With the motion vector $mv_k$, the reference block of current block $(x'_0, y'_0)$ and the reference block of the neighboring blocks $(x'_k, y'_k)$ in the reference frame can be derived:

$$(x'_0, y'_0) = (x_0, y_0) + (mv_{x_0}, mv_{y_0}) \quad (3)$$

$$(x'_k, y'_k) = (x_k, y_k) + (mv_{x_k}, mv_{y_k}) \quad (4)$$

In box 630, the sample position offset between the current block's reference block and the neighboring blocks' reference blocks can be derived as:

$$(\text{offset}_{x'_k}, \text{offset}_{y'_k}) = (x'_k, y'_k) - (x'_0, y'_0) \quad (5)$$

The transformation model parameters A can be derived through this equation:

$$[(\text{offset}_{x'_k}, \text{offset}_{y'_k})^T] = [(\text{offset}_{x_k}, \text{offset}_{y_k})^T] \cdot A \quad (6)$$

The affine model parameters A in the above equation can be solved using the least square regression method.

The motion vectors identified by box 610 likely are the motion vectors from the corresponding block in the reference frame that are in relationship to their own reference frame, thus the motion vectors from that reference frame to the current frame may be derived. With all available MVs from a block's neighboring blocks and the current block's own motion vector, denoted as MV, together with the velocity and acceleration information, the motion vectors from that reference frame to the current frame, denoted as MV', can be derived. With the affine model parameters A derived in box 620, the motion vector of each small block as shown in FIG. 7(b) in the current block can be derived based on its center position, and the current block's center position and motion vector.

The sample position offset from the small block i in the current block to the center of the current block can be computed as:

$$(\text{offset}_{a_i}, \text{offset}_{b_i}) = (a_i, b_i) - (x_0, y_0) \quad (7)$$

Where $(a_i, b_i)$ is the center position of the small block i.

The sample position offset between the reference block of the small block i and the reference block of the current block in the reference frame can be derived as:

$$[(\text{offset}_{a'_i}, \text{offset}_{b'_i})^T] = [(\text{offset}_{a_i}, \text{offset}_{b_i})^T] \cdot A \quad (8)$$

The sample position offset between the reference block of the small block i and the reference block of the current block in the reference frame can also be expressed as:

$$(x'_0, y'_0) = (x_0, y_0) + (mv_{x_0}, mv_{y_0}) \quad (9)$$

$$(a'_i, b'_i) = (a_i, b_i) + (mv_{a_i}, mv_{b_i}) \quad (10)$$

$$\begin{aligned}(\text{offset}_{a'_i}, \text{offset}_{b'_i}) &= (a'_i, b'_i) - (x'_0, y'_0) = (a_i, b_i) + \\ &\quad (mv_{a_i}, mv_{b_i}) - ((x_0, y_0) - (mv_{x_0}, mv_{y_0})) = (\text{offset}_{a_i}, \text{offset}_{b_i}) + (mv_{a_i}, mv_{b_i}) - (mv_{x_0}, mv_{y_0}) \end{aligned} \quad (11)$$

Then the motion vector $(mv_{a_i}, mv_{b_i})$ of the small block i in the current block can be derived from the above equation as:

$$(mv_{a_i}, mv_{b_i}) = (\text{offset}_{a'_i}, \text{offset}_{b'_i}) - (\text{offset}_{a_i}, \text{offset}_{b_i}) + (mv_{x_0}, mv_{y_0}) \quad (12)$$

The small block i's position along with its motion vector $(mv_{a_i}, mv_{b_i})$ in the reference frame can be used to derive its projected position in the current frame. $(-mv_{a_i}, -mv_{b_i})$ can be used as the motion vector for the projected block position in the current frame.

Then motion compensation can be executed to interpolate the virtual reference frame.

In an embodiment, motion from high priority reference frames can potentially result in more accurate projected motion and should have the highest priority if multiple motion vectors are being projected to the same position. Alternatively, all motion vectors could be considered and a weighted sum of all hypotheses could be computed based on their priority (or based on some "distortion" or probability/confidence criteria e.g. based as the similarity of each sample in the first block in reference A to the second block in reference B). The projected motion vectors from higher priority reference frames are assigned with higher priority than the ones from lower priority reference frames if multiple motion projections exist in the same position. In a particular embodiment, such motion vectors are not allowed to be overwritten by the motion vectors from lower priority reference frames. In this way, better motion projection can be provided thus interpolating a high quality virtual reference frame. The priority can be decided based on some or all of the motion information that correspond to the same location, using techniques such as weighted averaging, majority voting, non-linear, e.g. median, or linear filtering, using machine learning methods, and the like.

As discussed, motion vector projection may not result in coverage of the entire area of a virtual reference frame. Regions of a frame that remain uncovered following application of motion vector projection are terms "holes," for ease of reference. A block without any or with only partial projected motion vector information is called a hole in this context. A hole could appear due to occlusion/disocclusion, or the source block in the reference frame has no motion vector, for example, being coded using intra prediction. To better generate the interpolated frame, the hole can be filled by using different ways:

In one aspect, a hole may be filled by applying available projected motion vectors in neighboring blocks to block in which a hole appears. FIG. 8(b), for example, illustrates an exemplary virtual reference frame FVREF in which a hole arises after other motion projection operations are performed, represented FIG. 8(a). Neighboring blocks often have high spatial correlation in video sequences, thus the projected motion vector mv0 from neighboring blocks can provide a reliable estimation $mv_v$ for a current block that occurs in a hole.

The hole can also be filled using a more complex approach. In another aspect, an encoder may perform a motion search in a reference frame F2 (FIG. 8) with another reference frame F1 when the prediction mode of a block in the reference frame F2 is intra, or if there is no direct/indirect motion vector between the two reference frames F1, F2. This can improve the precision of the projected motion vector for blocks that occur in a hole.

In other aspect, when a projected position related to a current block PB0 position is a hole, the method may analyze neighboring blocks to the current block for can be reviewed to determine if motion vectors are available and if they have any sample similarity with samples of the current block. If neighboring blocks are available with similar samples as the current block and they are coded using $b_i$-prediction, then the motion vectors of these neighboring blocks can be utilized to fill the hole. If multiple motion vectors are available from the neighborhood, a weighting function for these motion vectors can be conducted and then uses to fill the hole. As the neighboring blocks with similar samples have strong correlation with the current block, this on-the-fly update algorithm can help provide high quality of projected motions for the hole, and improve the interpolated virtual reference frame pixel quality, which can help reduce the prediction residual and improve coding efficiency.

In an aspect, inpainting can also be utilized to fill the hole, like traditional patch-based and diffusion-based inpainting. Meanwhile, machine learning based inpainting, like convolutional neural network ("CNN")-based and/or generative adversarial network ("GAN")-based methods, can also be applied to fill the hole as they already have been successfully applied to restore the image where parts of the image are missed, and achieve visual pleasure results.

Hole filling techniques are an optional feature that need not be applied in all circumstances. It may occur that applying hole filling will incur increasing complexity and consumption of processing resources in a video coding system, which system designers may decide are not warranted for their applications. In such circumstances, the hole filling process can be skipped or replaced by a crude interpolation technique such as directly copying pixels from collocated blocks in the reference frames. The virtual reference frame is proposed for use as a prediction reference, which does not need to be perfect. The encoder's other prediction mechanisms, particularly cost distortion estimation processes, are likely to avoid poorly constructed regions of virtual reference frames from being selected as prediction references for other frames because, for example, those regions of the virtual reference frames ultimately will provide poor prediction references for the other frames. In such circumstances, the prediction algorithm likely will a different reference frame for use in predictive coding.

When a motion vector is block based and the projected motion vector in a hole can be filled with a neighboring block's projected motion vector, this could result in a discrepancy of the motion vector around a block boundary. In an embodiment, to reduce the potential of block-based artifacts in the interpolated frame and increase the quality, different filters can be applied to smooth the motion vector field. One may use, for example, an averaging filter or a median filter for smoothing the motion vectors, or a deblocking scheme, similar to the one used in AVC, HEVC, AV1, or VVC for smoothing the samples at block boundaries. Other filters, such as bilateral filtering, non-local means denoising, and the like, could also be used. Machine learning based algorithms, like CNN model can also be applied to filter the projected motion vector since CNN model already shows its competitive advantage to fetch context not just from the local but also from the global regions. Encoder signaling of the filters could also be included to improve the characteristics of this reference frame. Similar concepts also apply to illumination change parameters and not only motion vectors, or even other types of disparity information that may be associated with a block.

Adaptive MV smoothing can also be applied based on the difference of the current block's motion vector and its neighboring blocks' motion vectors. If the difference of the current block's motion vector and its neighboring blocks' motion vector is small, then an averaging filter can be used since in this case the current block and its neighboring block have very similar features. However, if the difference of the current block's motion vector and its neighboring blocks' motion vector is very large, it is possible that the current block and its neighboring block are around object boundaries or edges, using an averaging filter to smooth the motion vector field might hurt the performance, in this case without smoothing or using a median filter could be a better choice.

Once the projected motion vectors for the current frame are derived, the neighboring reference frame can be warped based on the projected motion vector to obtain the warped reference frames. Various interpolation methods can be employed to generate samples at sub-pixel precision, such as fixed tap filters, separable/non-separable filters, adaptive filter, or even the filter coefficients can be transmitted to the decoder similar to how ALF is signaled in VVC. Warping may generate a pair of frames, one developed from frame F1 and another developed from frame F2, representing projections of the respective frames along the developed motion vectors at the temporal location of the virtual reference frame $F_{VREF}$. A conceptual example of the warping process is illustrated in FIG. 10(a).

After the warped frames are generated, they can be blended to generate the final interpolated frame. Various algorithms can be exploited to blend the warped frames, such as:

Average blend: Equal weighting may be assigned to the two warped frames;

Pixel Difference Weighted Blend: The weighting coefficient for each pixel may be computed based on a difference of the related pixel in the two warped frames; Spatial Neighbor weighting can also be considered to further adjust the weighting for the current pixel.

Distance Weighted Blend: The weighting coefficient may be derived based on the temporal distance of the two reference frames with the current frame. Large temporal distance is assigned with small weighting coefficient because in general a large temporal distance can indicate a weak temporal correlation.

Adaptive Blend: For an on-the-fly update process, a similarity between the current block and its neighboring blocks can be checked. If the samples of neighboring blocks are similar with those in the current block, then the blending algorithm of the neighboring blocks can be utilized to blend the warped blocks and then update the virtual reference frame.

Machine learning based models, like CNN, can be applied to compute the blending weights.

Projected motion vectors of a virtual reference frame and motion vectors from other frames that are coded predictively with reference to virtual reference frames can use motion vector prediction to improve the compression efficiency of the motion vectors and reduce the bit signaling overhead. In existing video coding standards, the motion vectors of neighboring reconstructed blocks are commonly used as a predictor for the motion vector of a current coding block. Using this technique motion vector differences (MVD) or motion vector prediction residuals are coded and transmitted to the decoder. Signaling the MVD instead of the motion vector itself can reduce considerably the amount of overhead bits and improve compression efficiency. Beyond these techniques, further coding efficiencies can be achieved to represent motion vectors.

Figure 11A:
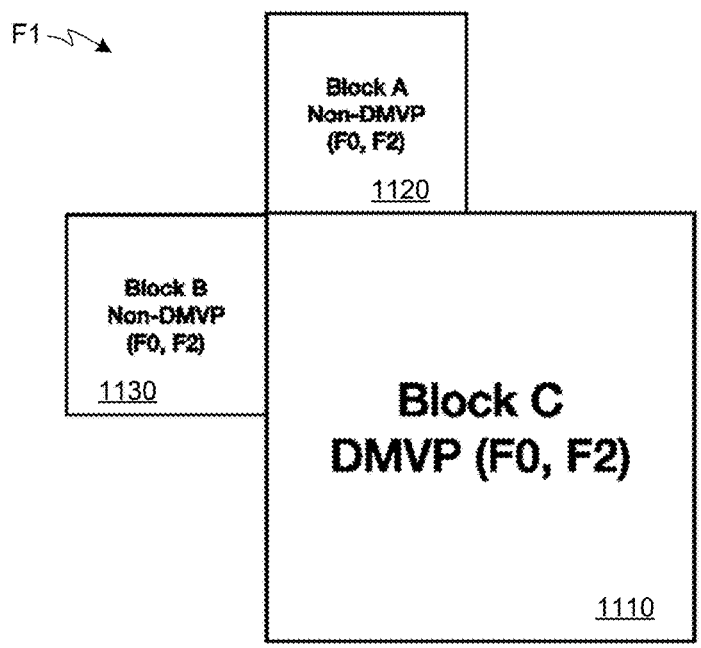
FIG. 11(a) illustrates spatial relationships among pixel blocks for motion vector prediction and FIG. 11(b) illustrates spatial-temporal relationships among such pixel blocks.
Figure 11B:
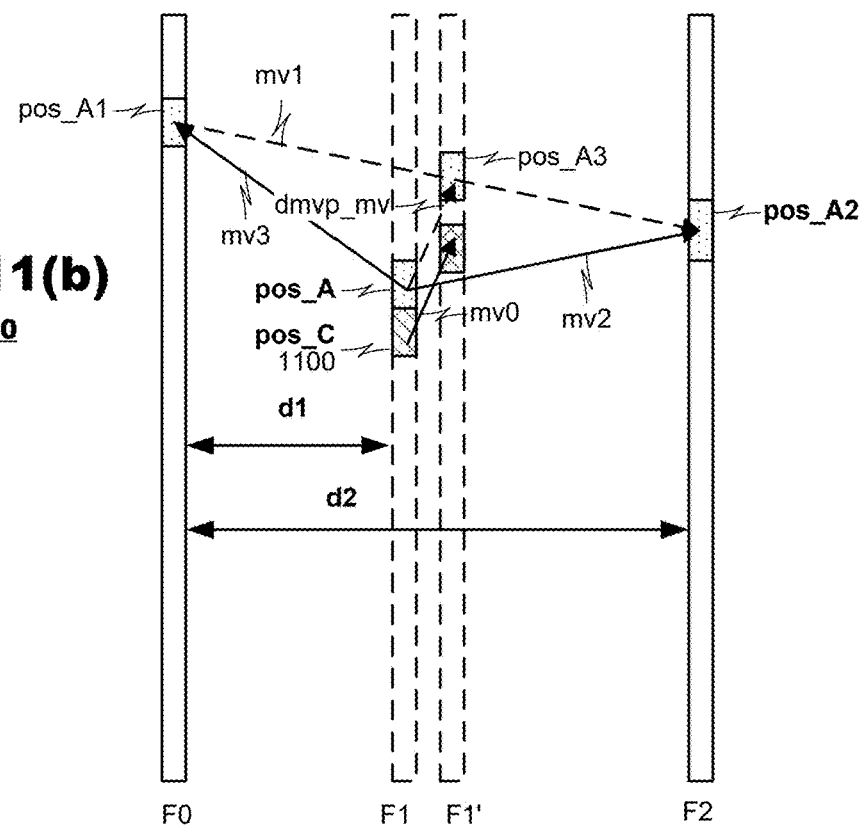

FIG. 11 illustrates application of spatial motion vector prediction according to an embodiment of the present disclosure. FIG. 11(a) illustrates a pixel block C 1110 being currently-coded (the "current block") oriented spatially with respect to two previously coded pixel blocks A, B 1120, 1130 within its frame F1. FIG. 11(b) illustrates the current block C and pixel block A within frame F1. FIG. 11(b) also illustrates a virtual reference frame F1' at the same temporal position as frame F1, and reference frames F0, F2, which serve as prediction references for the virtual reference frame F1. In the example of FIG. 11, the current block C is coded using the motion vector projection mode (shown as "DMVP"), the neighboring blocks A, C are coded as a conventional compound inter-prediction mode, but the neighboring blocks A, C have the same reference frames (F0, F2) as the virtual reference frame F1', as shown. Moreover, in this example, mv0 represents a motion vector of the current coding block C to its matching block in the virtual reference frame F1', mv1 and mv2 represent the motion vectors of neighboring block A to its reference frames F0 and F2, respectively, d1 represents the temporal distance between the current frame F1 and its forward reference F0, and d2 represents the temporal distance between the two reference frames F0 and F2.

Through mv1 and mv2, an offset between pos_A1 and pos_A2 (the positions of block A in the reference frames F0 and F2) can be derived as:

$$dmvp\_mv = mv2 - mv1. \quad (13)$$

Conducting the motion projection, a projected position (pos_A3) of block A in the virtual reference frame F1' may be derived as:

$$pos\_A3 = pos\_A1 + d1/d2 * dmvp\_mv. \quad (14)$$

An offset between a neighboring block A (pos_A) and the projected position in F1' can be computed as:

$$\begin{aligned} mv3 &= pos\_A3 - pos\_A & (15) \\ &= pos\_A1 + d1/d2 * dmvp\_mv - pos\_A \\ &= (pos\_A + mv1) + d1/d2 * dmvp\_mv - pos\_A \\ &= (pos\_A + mv1) + d1/d2 * (mv2 - mv1) - pos\_A \\ &= (1 - d1/d2) * mv1 + d1/d2 * mv2. \end{aligned}$$

The derived offset mv3 can be used as the prediction of the motion vector mv0 of the current block to reduce motion vector redundancy.

Figure 12A:
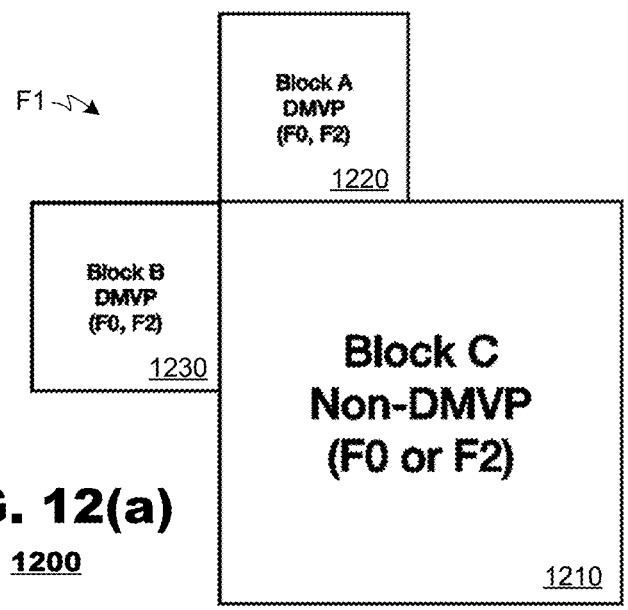
FIG. 12(a) illustrates spatial relationships among pixel blocks for motion vector prediction and FIG. 12(b) illustrates spatial-temporal relationships among such pixel blocks.
Figure 12B:
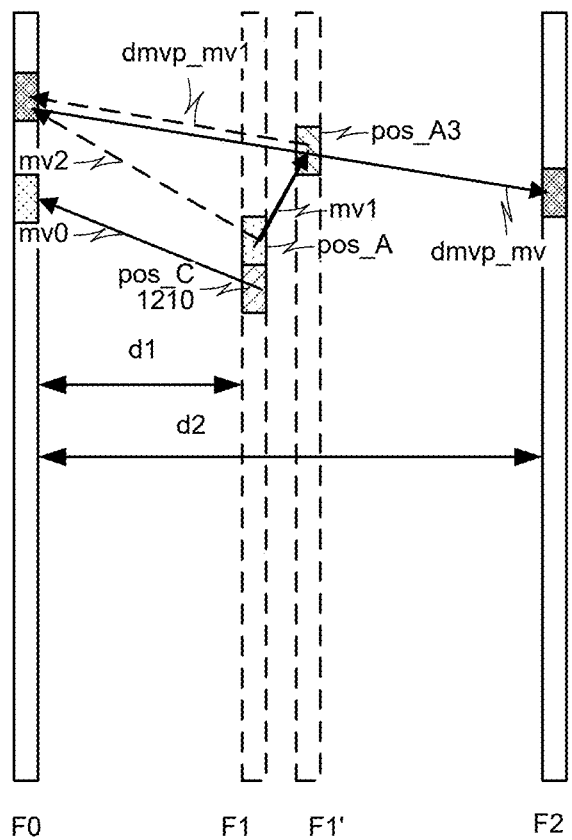

FIG. 12 illustrates application of spatial motion vector prediction according to another embodiment of the present disclosure. FIG. 12(a) illustrates a current block C 1210 being currently-coded oriented spatially with respect to two previously coded pixel blocks A, B 1220, 1230 within its frame F1. FIG. 12(b) illustrates the current block C and pixel block A within frame F1. FIG. 12(b) also illustrates a virtual reference frame F 1' at the same temporal position as frame F1, and reference frames F0, F2, which serve as prediction references for the virtual reference frame F1. In the example of FIG. 12, the current block C is coded using a DMVP motion vector projection mode, the neighboring blocks A, C are coded as a conventional compound inter-prediction mode, and the neighboring blocks A, C have the same reference frames (F0, F2) as the virtual reference frame F1', as shown. Moreover, in this example, mv0 represents a motion vector of the current coding block C to its matching block in reference frame F0; mv1 and mv2 represent the motion vectors of neighboring block A in the virtual reference frame F1' and reference frame F0, respectively; d1 represents the temporal distance between the current frame F1 and its forward reference F0; and d2 is the temporal distance between the two reference frames F0 and F2.

With mv1 and the neighboring block's position pos_A, the reference block A's position in the virtual reference frame can F1' be derived as:

$$pos\_A3 = pos\_A + mv1. \quad (16)$$

With the projected motion vector dmvp_mv extending from pos_A3, the projected motion vector to the forward reference frame F0 can be derived as:

$$dmvp\_mv1 = -d1/d2 * dmvp\_mv \quad (17)$$

Once dmvp_mv1 is derived, mv2 can be derived as the vector addition of dmvp_mv1 and mv1 as:

$$mv2 = mv1 + dmvp\_mv1 \quad (18)$$

The motion vector mv2 can be employed as the predictor of the motion vector mv0 of the current block to reduce the motion vector redundancy.

Figure 13A:
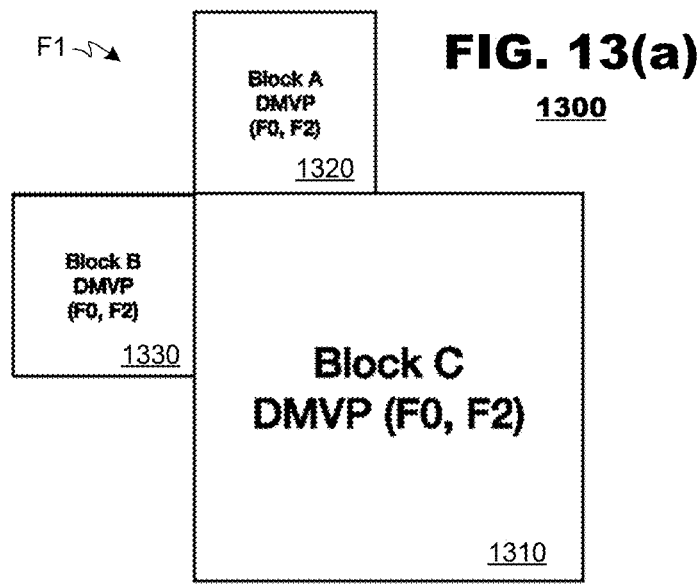
FIG. 13(a) illustrates spatial relationships among pixel blocks for motion vector prediction and FIG. 13(b) illustrates spatial-temporal relationships among such pixel blocks.
Figure 13B:
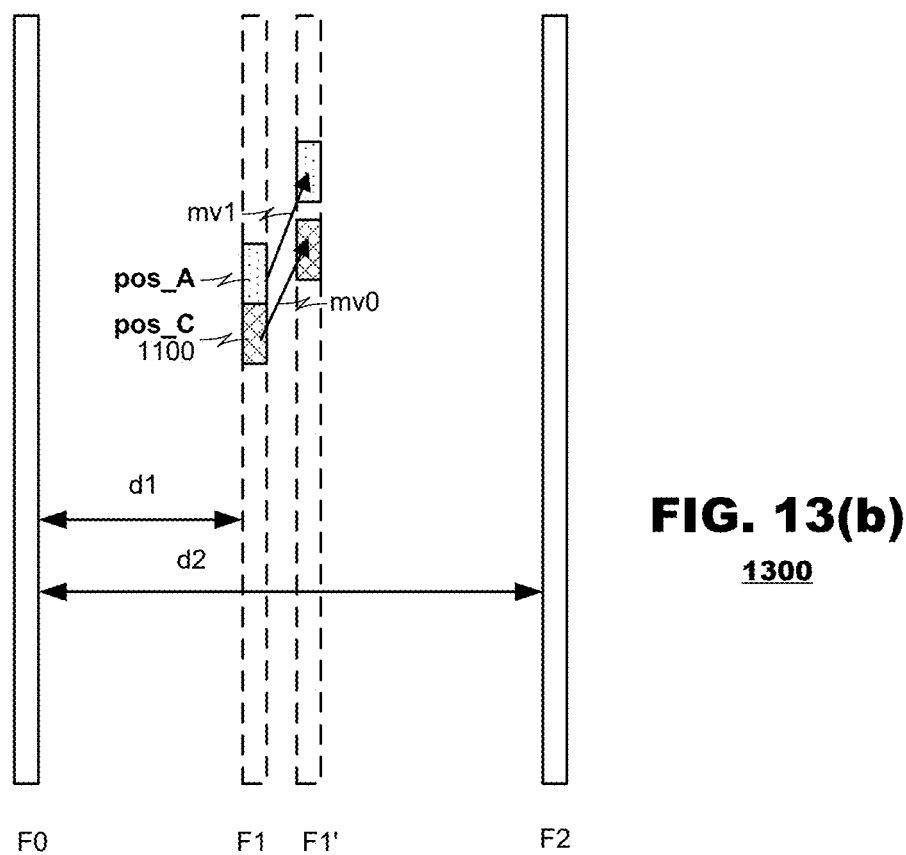

FIG. 13 illustrates application of spatial motion vector prediction according to a further embodiment of the present disclosure. FIG. 13(a) illustrates a current block C 1310 oriented spatially with respect to two previously coded pixel blocks A, B 1320, 1330 within its frame F1. FIG. 13(b) illustrates the current block C and pixel block A within frame F1. FIG. 13(b) also illustrates a virtual reference frame F1' at the same temporal position as frame F1, and reference frames F0, F2, which serve as prediction references for the virtual reference frame F1. In the example of FIG. 13, the current block C is coded using a DMVP motion vector projection mode, the neighboring blocks A, C are coded as a conventional compound inter-prediction mode, and the neighboring blocks A, C have the same reference frames (F0, F2) as the virtual reference frame F1', as shown. Moreover, in this example, mv0 represents a motion vector of the current coding block C to the virtual reference frame; mv1 represents the motion vector of neighboring block A to the virtual reference frame F1'; d1 represents the temporal distance between the current frame F1 and its forward reference F0; and d2 represents the temporal distance between the two reference frames F0 and F2.

In this example, since the reference block of the current coding block and its neighboring block all point to the virtual reference frame F1', the motion vector of the neighboring block, mv1, can be directly used as the prediction of the motion vector mv0 of the current coding block to reduce motion vector redundancy.

Figure 14A:
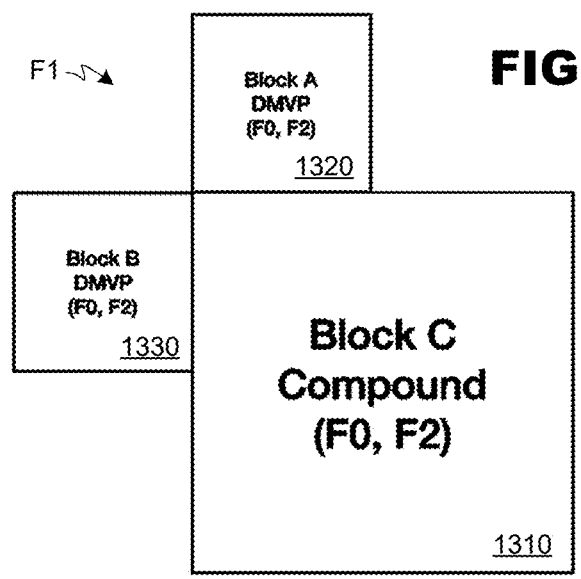
FIG. 14(a) illustrates spatial relationships among pixel blocks for motion vector prediction and FIG. 14(b) illustrates spatial-temporal relationships among such pixel blocks.
Figure 14B:
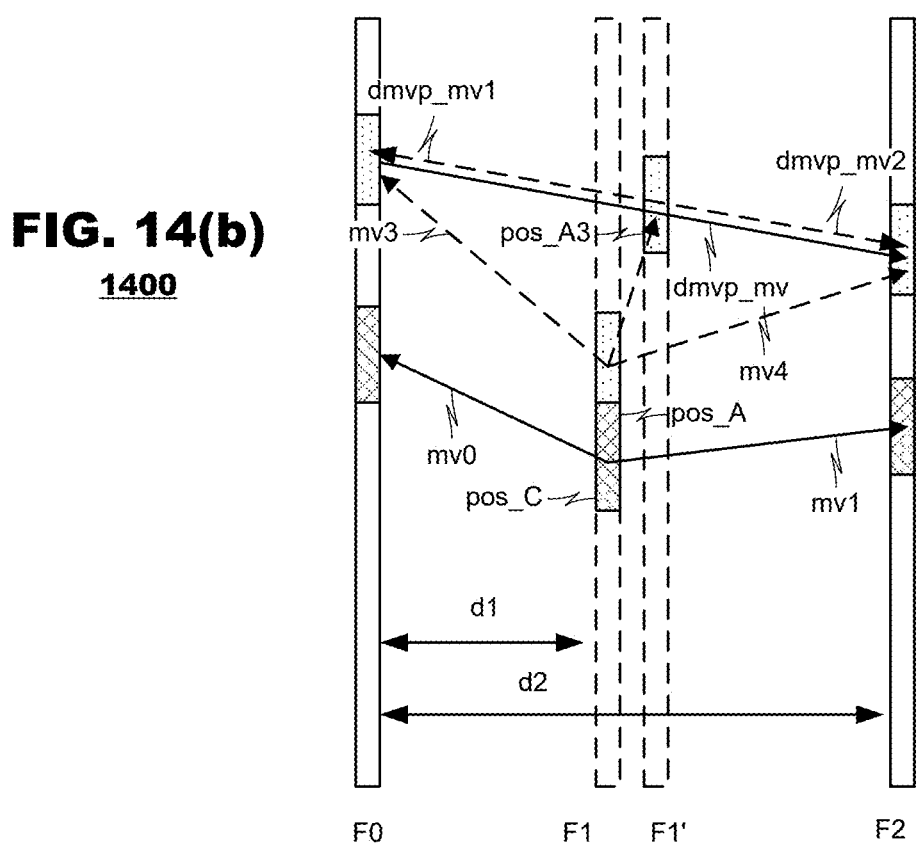

In other embodiments, motion vectors from blocks coded by direct motion vector prediction (again DMVP) may be used for prediction of motion vectors of blocks coded by other prediction modes. FIG. 14(a) illustrates a coding example in which a current block C 1410 is oriented spatially with respect to two previously-coded pixel blocks A, B 1420, 1430 within its frame F1. FIG. 14(b) illustrates the current block C and pixel block A within frame F1. FIG. 14(b) also illustrates a virtual reference frame F1' at the same temporal position as frame F1, and reference frames F0, F2, which serve as prediction references for the virtual reference frame F1. In the example of FIG. 14, the current block C is coded using a compound motion vector projection mode, the neighboring blocks A, C are coded using DMVP modes, and the neighboring blocks A, C have the same reference frames (F0, F2) as the virtual reference frame F1', as shown. Moreover, in this example, mv0 and mv1 represent motion vectors of the current coding block C to the reference frames F0 and F2, respectively, and mv2 represents a motion vector from block A (at pos_A) to its reference block in the virtual reference frame F1'.

With mv2 and the neighboring block's position pos_A, the reference block position in the virtual reference frame F1' can be derived as:

$$pos\_A3 = pos\_A + mv1. \quad (19)$$

With the projected motion vector dmvp_mv in pos_A3, the projected motion vector to the forward reference frame F0 and the backward reference frame F2 can be derived as:

$$dmvp\_mv1 = -d1/d2 * dmvp\_mv \quad (20)$$

$$dmvp\_mv2 = (1-d1/d2) * dmvp\_mv \quad (21)$$

With the vector addition of mv2 and the derived dmvp_mv1 and dmvp_mv2, mv2 and mv4 can be derived as:

$$mv3 = mv2 + dmvp\_mv1 \quad (22)$$

$$mv4 = mv2 + dmvp\_mv2 \quad (23)$$

Then, mv3 and mv4 can be utilized as the prediction of the motion vectors mv0 and mv1 of the current coding block C, respectively, to reduce motion vector redundancy.

Figure 15:
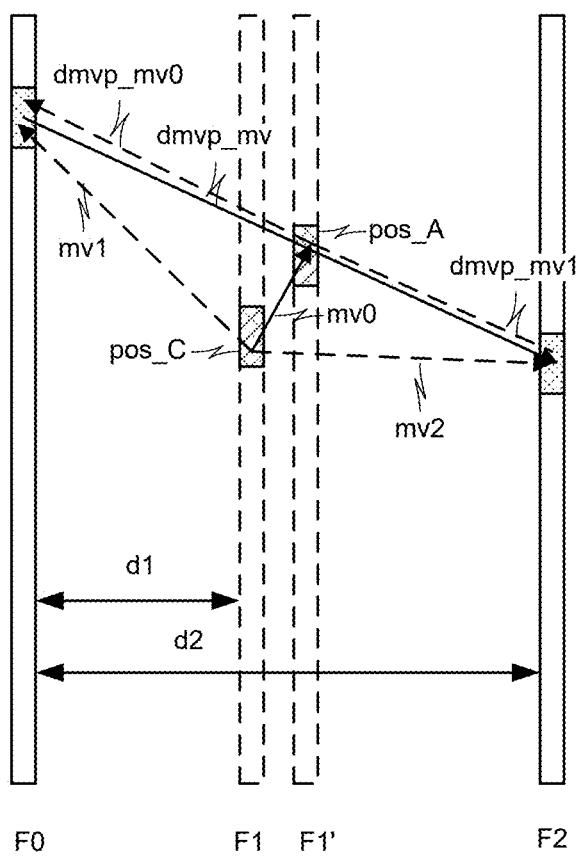
FIG. 15 illustrates application of motion vector prediction according to a further embodiment of the present disclosure.

In another embodiment, a direct motion vector prediction (DMVP) may be used to derive motion vectors for later-coded frames (called "temporal motion vector prediction" or "TMVP") and the later-coded frames using DMVP. FIG. 15 illustrates a coding example where TMVP of a later-coded frame (also called a "future" frame) may be performed. In FIG. 15, a current block C 1510 may be coded with a motion vector mv0 that references a block in a virtual reference frame F1'. With mv0 and the current block's position pos_C, the reference block position pos_A in the virtual reference frame F1' can be derived as:

$$pos\_A = pos\_C + mv0. \quad (24)$$

From pos_A and using the projected motion vector dmvp_mv, the projected motion vector to the forward reference frame and the backward reference frame can be derived as:

$$dmvp\_mv0 = -d1/d2 * dmvp\_mv \quad (25)$$

$$dmvp\_mv1 = (1-d1/d2) * dmvp\_mv \quad (26)$$

With vector addition of mv0 and the derived dmvp_mv0 and dmvp_mv1, mv1 and mv2 can be derived as:

$$mv1 = mv0 + dmvp\_mv0 \quad (27)$$

$$mv2 = mv0 + dmvp\_mv1 \quad (28)$$

Once they are derived, the motion vectors mv1 and mv2 can be saved from single prediction or bi-prediction for future frames. The motion vectors mv1 and mv2 can also be utilized for a future frame's motion projection to generate their corresponding DMVP frame. This technique can help reduce motion vector redundancy and the number of holes after motion projection, and consequently improve the video quality of the interpolated virtual reference frames and reduce the prediction residual.

Figure 16:
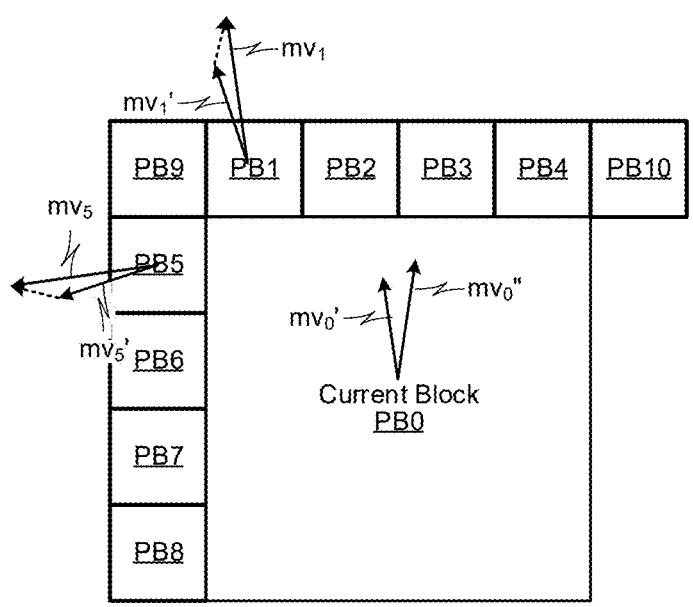
FIG. 16 illustrates application of motion vector prediction according to another embodiment of the present disclosure.

As discussed above, the hole of a virtual reference frame (FIG. 8(b)) can be filled on-the-fly with motion information of previously-coded blocks in its neighborhood. The same or similar processing can be applied to refine a current block's projected motion vector by using the motion vectors of previously-coded blocks in its neighborhood before coding the current block. Using the motion vectors of previously-coded blocks in a current block's neighborhood can help refine the projected motion vector of the current block and improve the interpolated DMVP frame quality. FIG. 16 shows a coding example in which motion vectors of previously-coded blocks PB1, PB5 in a spatial neighborhood of a current block PB0 are used to refine the projected motion vector of the current block.

As shown in FIG. 16, $mv_k$ represents the motion vector of a previous coded block k in the neighborhood of a current block PB0, and $mv_k'$ represents the projected motion vector of block k that is derived from motion projection. The difference of the motion vector of block k and its projected motion vector can be derived as:

$$mvd_k = mv_k - mv'_k \quad (29)$$

If multiple blocks are available, then their MVD between the motion vector and the projected motion vector can be computed as:

$$\hat{mvd} = \sum_k w_k * mvd_k \quad (30)$$

Where $w_k$ is a weighting coefficient.

The final motion vector differential mvd can be applied to refine the projected motion vector of the current block as:

$$mv''_0 = mvd + mv'_0 \quad (31)$$

With this refined projected motion vector, the corresponding block in the virtual reference frame can be re-interpolated to improve prediction quality.

In another embodiment, with the available neighboring blocks that have the same reference frames as the current block, its motion vectors together with the refined projected motion vector of the current block can be utilized to derive affine transformation model parameters, as described with respect to FIG. 7(b). Then the derived affine transformation model parameters can be used to perform motion compensation and to interpolate the corresponding block in the virtual reference frame.

Figure 17:
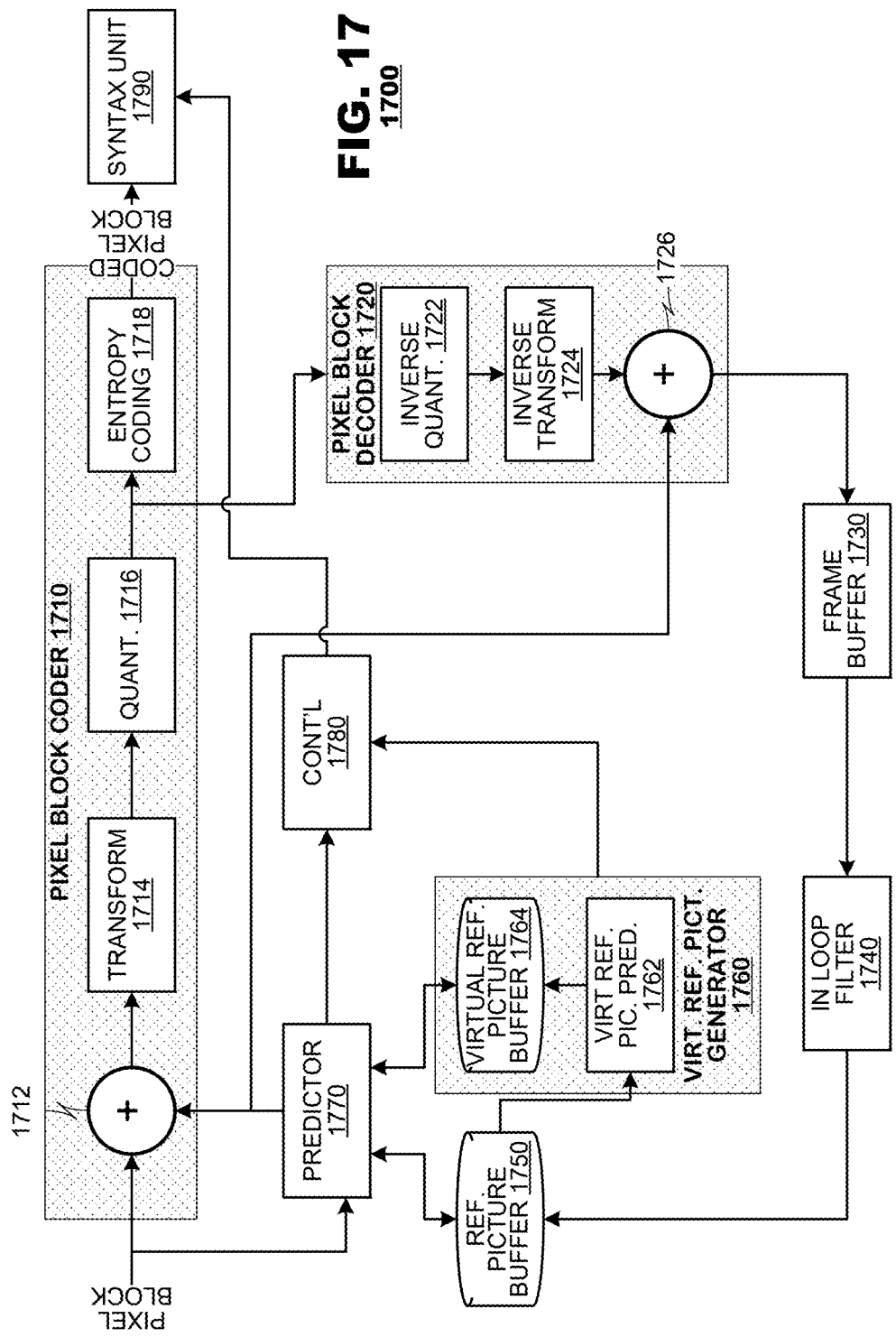
FIG. 17 is a functional block diagram of a coding system 1700 according to an aspect of the present disclosure.

FIG. 17 is a functional block diagram of a coding system 1700 according to an aspect of the present disclosure. The system 1700 may include a pixel block coder 1710, a pixel block decoder 1720, a frame buffer 1730, an in loop filter system 1740, reference picture buffer 1750, a virtual reference picture generator 1760, a predictor 1770, a controller 1780, and a syntax unit 1790. The coding system 1700 may operate on predetermined units of video frames, called "pixel blocks," for convenience, to code the pixel blocks differentially according to predictive techniques. Thus, a frame of video to be coded may be parsed into pixel blocks, which the pixel block encoder 1710 processes on a pixel block-by-pixel block basis. The pixel block coder 1710 may present coded pixel block data to the syntax unit 1790, which formats the coded pixel block data into a transmission syntax that conforms to a governing coding protocol.

The pixel block decoder 1720 may decode the coded pixel block data, generating decoded pixel block data therefrom. The frame buffer 1730 may generate reconstructed frame data from the decoded pixel block data. The in-loop filter 1740 may perform one or more filtering operations on the reconstructed frame. For example, the in-loop filter 1740 may perform deblocking filtering, sample adaptive offset (SAO) filtering, adaptive loop filtering (ALF), maximum likelihood (ML) based filtering schemes, deringing, debanding, sharpening, resolution scaling, and the like. Filtered frames may be stored either in a reference picture buffer 1750 where it may be used as a source of prediction of later-received pixel blocks.

The pixel block coder 1710 may include a subtractor 1712, a transform unit 1714, a quantizer 1716, and an entropy coder 1718. The pixel block coder 1710 may accept pixel blocks of input data at the subtractor 1712. The subtractor 1712 may receive predicted pixel blocks from the predictor 1770 and generate an array of pixel residuals therefrom representing a difference between the input pixel block and the predicted pixel block. The transform unit 1714 may apply a transform to the sample data output from the subtractor 1712, to convert data from the pixel domain to a domain of transform coefficients. In some scenarios (for example, when operating in high dynamic range) prior to transform unit 1714 and/or subtractor 1712, the input may be reshaped, or an adaptation scheme be applied to adjust to the content transfer characteristics. Such an adaption can be either a simple scaling, based on a re-mapping function, or a more sophisticated pixel manipulation technique. The quantizer 1716 may perform quantization of transform coefficients output by the transform unit 1714 according to a quantization parameter qp. The quantizer 1716 may apply either uniform or non-uniform quantization parameters; non-uniform quantization parameters may vary across predetermined locations of the block of coefficients output from the transform unit 1714. The entropy coder 1718 may reduce bandwidth of the output of the coefficient quantizer by coding the output, for example, by variable length code words or using a context adaptive binary arithmetic coder.

The transform unit 1714 may operate in a variety of transform modes as determined by the controller 1780. For example, the transform unit 1714 may apply a discrete cosine transform (DCT), a discrete sine transform (DST), a Walsh-Hadamard transform, a Haar transform, a Daubechies wavelet transform, or the like. In an aspect, the controller 1780 may select a coding mode to be applied by the transform unit 1715, may configure the transform unit 1715 accordingly and may signal the coding mode in the coded video data, either expressly or impliedly.

The quantizer 1716 may operate according to a quantization parameter qp that is determined by the controller 1780. Techniques for developing the quantization parameter are discussed hereinbelow. The controller 1780 may provide data to the syntax unit 1790 representing its quantization parameter selections.

The entropy coder 1718, as its name implies, may perform entropy coding of data output from the quantizer 1716. For example, the entropy coder 1718 may perform run length coding, Huffman coding, Golomb coding, Context Adaptive Binary Arithmetic Coding, and the like.

The pixel block decoder 1720 may invert coding operations of the pixel block coder 1710. For example, the pixel block decoder 1720 may include a dequantizer 1722, an inverse transform unit 1724, and an adder 1726. In some scenarios (for example, when operating in high dynamic range) post to inverse transform unit 1724 and/or adder 1726, the input may be inverse reshaped or re-mapped typically according to a function that was applied at the encoder and content characteristics. The pixel block decoder 1720 may take its input data from an output of the quantizer 1716. Although permissible, the pixel block decoder 1720 need not perform entropy decoding of entropy-coded data since entropy coding is a lossless event. The dequantizer 1722 may invert operations of the quantizer 1716 of the pixel block coder 1710. The dequantizer 1722 may perform uniform or non-uniform de-quantization as specified by the quantization parameter data qp. Similarly, the inverse transform unit 1724 may invert operations of the transform unit 1714. The dequantizer 1722 and the inverse transform unit 1724 may use the same quantization parameters qp and transform modes as their counterparts in the pixel block coder 1710. Quantization operations likely will truncate data in various respects and, therefore, data recovered by the dequantizer 1722 likely will possess coding errors when compared to the data presented to the quantizer 1716 in the pixel block coder 1710.

The adder 1726 may invert operations performed by the subtractor 1712. It may receive the same prediction pixel block from the predictor 1770 that the subtractor 1712 used in generating residual signals. The adder 1726 may add the prediction pixel block to reconstructed residual values output by the inverse transform unit 1724 and may output reconstructed pixel block data.

As described, the frame buffer 1730 may assemble a reconstructed frame from the output of the pixel block decoders 1720. The in-loop filter 1740 may perform various filtering operations on recovered pixel block data. For example, the in-loop filter 1740 may include a deblocking filter, a sample adaptive offset ("SAO") filter, and/or other types of in loop filters (not shown). The reference picture buffer 1750 may store filtered frame data output by the in-loop filter 1740 for use in later prediction of other pixel blocks.

The virtual reference picture generator 1760 may generate virtual reference frames. The virtual reference picture generator 1760 may include a virtual reference picture predictor 1762 and a virtual reference picture buffer 1764. The virtual reference picture predictor 1762 may generate virtual reference frames according to the techniques discussed herein with respect to any of FIGS. 3-16. The virtual reference picture predictor 1762 may generate the virtual reference frames from reference frames stored in the reference picture buffer 1750. The virtual reference picture buffer 1764 may store the virtual reference frames so generated for use in prediction by the predictor 1770.

Different types of prediction data are made available to the predictor 1770 for different prediction modes. For example, for an input pixel block, intra prediction takes a prediction reference from decoded data of the same frame in which the input pixel block is located. Thus, the reference frame store 1750 may store decoded pixel block data of each frame as it is coded. For the same input pixel block, inter prediction may take a prediction reference from previously coded and decoded frame(s) that are designated as reference frames. Thus, the reference frame store 1750 may store these decoded reference frames.

The predictor 1770 may supply prediction blocks to the pixel block coder 1710 for use in generating residuals. The predictor 1770 may perform prediction search operations according to intra mode coding, and uni-predictive, $b_i$-predictive, and/or multi-hypothesis inter mode coding. For intra mode coding, the predictor 1770 may search from among pixel block data from the same frame as the pixel block being coded that provides the closest match to the input pixel block. For inter mode coding, the predictor 1770 may search from among pixel block data of other previously coded frames stored in the reference picture buffer 1750 that provides a match to the input pixel block. From among the predictions generated according to the various modes, the predictor 1770 may select a mode that achieves the lowest distortion when video is decoded given a target bitrate. Exceptions may arise when coding modes are selected to satisfy other policies to which the coding system 1700 adheres, such as satisfying a particular channel behavior, or supporting random access or data refresh policies.

When performing prediction searches within virtual reference frames stored in the virtual reference frame buffer 1764, the predictor 1770 may perform direct motion projection and temporal motion projection as described hereinabove.

The controller 1780 may control overall operation of the coding system 1700. The controller 1780 may select operational parameters for the pixel block coder 1710 and the predictor 1770 based on analyses of input pixel blocks and also external constraints, such as coding bitrate targets and other operational parameters. As is relevant to the present discussion, when it selects quantization parameters, the use of uniform or non-uniform quantizers, and/or the transform mode, it may provide those parameters to the syntax unit 1790, which may include data representing those parameters in the data stream of coded video data output by the system 1700. The controller 1780 also may select between different modes of operation by which the system may generate reference images and may include metadata identifying the modes selected for each portion of coded data.

During operation, the controller 1780 may revise operational parameters of the quantizer 1716 and the transform unit 1715 at different granularities of image data, either on a per pixel block basis or on a larger granularity (for example, per frame, per slice, per largest coding unit ("LCU") or Coding Tree Unit (CTU), or another region). In an aspect, the quantization parameters may be revised on a per-pixel basis within a coded frame.

Additionally, as discussed, the controller 1780 may control operation of the in-loop filter 1750 and the prediction unit 1770. Such control may include, for the prediction unit 1770, mode selection (lambda, modes to be tested, search windows, distortion strategies, etc.), and, for the in-loop filter 1750, selection of filter parameters, reordering parameters, weighted prediction, etc.

The foregoing discussion has presented techniques for deriving virtual reference frames for use in predictive coding of pixel blocks of an input video sequence. Oftentimes, an encoder 1700 will generate virtual reference frames that are not selected by a predictor 1770 for use as prediction reference. In an embodiment, a controller 1780 may refrain from providing signaling representing a virtual reference frame until the predictor 1770 selects a virtual reference picture for use in prediction of an input pixel block.

Figure 18:
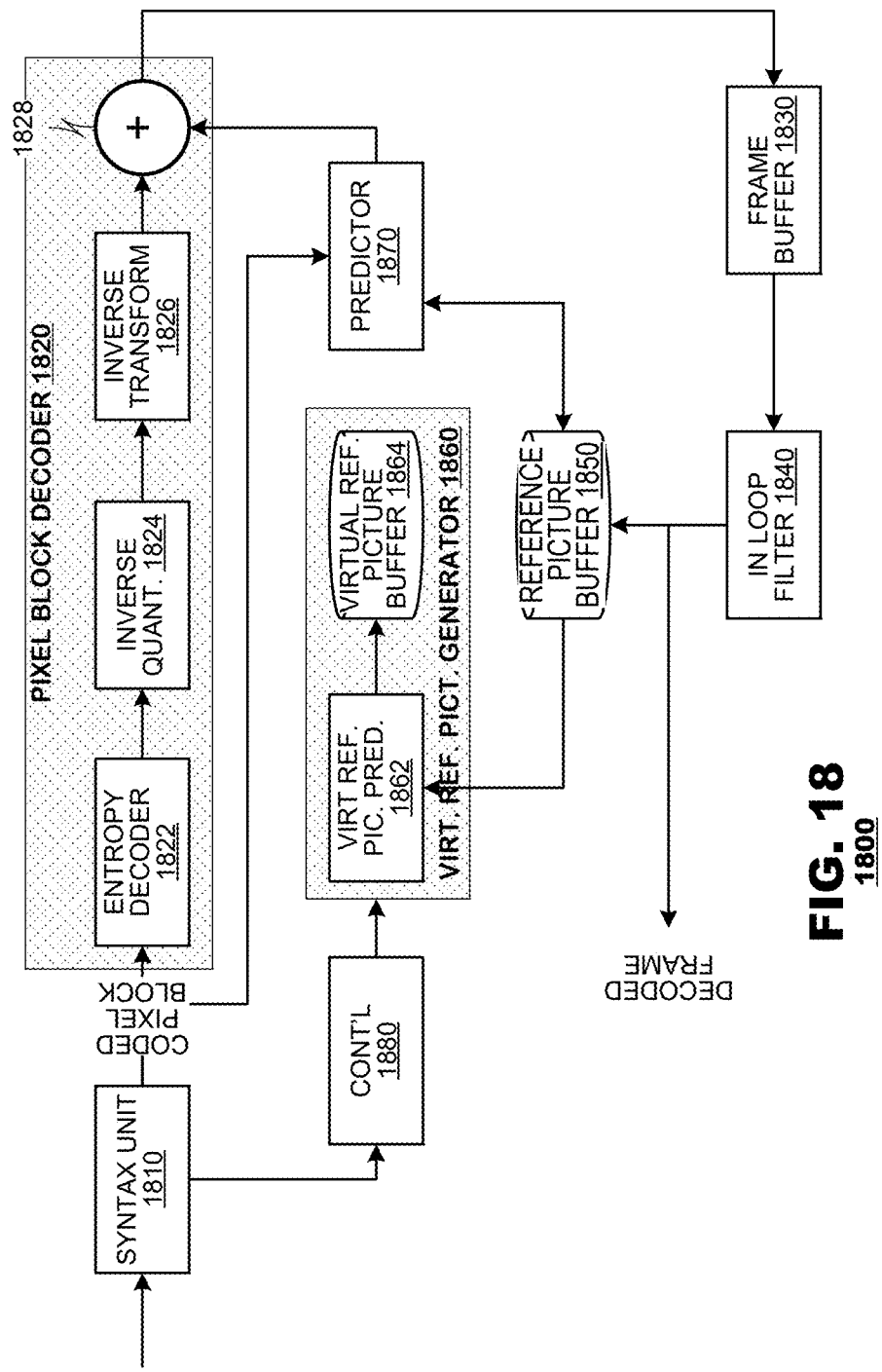
FIG. 18 is a functional block diagram of a decoding system 1800 according to an aspect of the present disclosure.

FIG. 18 is a functional block diagram of a decoding system 1800 according to an aspect of the present disclosure. The decoding system 1800 may include a syntax unit 1810, a pixel block decoder 1820, a frame buffer 1830, an in-loop filter 1840, a reference picture buffer 1850, a virtual reference picture generator 1860, a predictor 1870, and a controller 1880.

The syntax unit 1810 may receive a coded video data stream and may parse the coded data into its constituent parts. Data representing coding parameters may be furnished to the controller 1880, while data representing coded residuals (the data output by the pixel block coder 1710 of FIG. 17) may be furnished to the pixel block decoder 1820. The predictor 1870 may generate a prediction block from reference frame data available in the reference picture buffer 1850 or the virtual reference picture generator 1860 as determined by coding parameter data provided in the coded video. The predictor 1870 may supply the prediction block to the pixel block decoder 1820.

The pixel block decoder 1820 may invert coding operations applied by the pixel block coder 1710 (FIG. 17). The frame buffer 1830 may create a reconstructed frame from decoded pixel blocks output by the pixel block decoder 1820. The in-loop filter 1840 may filter the reconstructed frame data. The filtered frames may be output from the decoding system 1800. Filtered frames that are designated to serve as reference frames also may be stored in the reference picture buffer 1850.

The pixel block decoder 1820 may include an entropy decoder 1822, a dequantizer 1824, an inverse transform unit 1826, and an adder 1828. The entropy decoder 1822 may perform entropy decoding to invert processes performed by the entropy coder 1718 (FIG. 17). The dequantizer 1824 may invert operations of the quantizer 1716 of the pixel block coder 1710 (FIG. 17). Similarly, the inverse transform unit 1826 may invert operations of the transform unit 1714 (FIG. 17). They may use the quantization parameters and transform modes that are identified in the coded video data stream. Because quantization is likely to truncate data, the pixel blocks recovered by the dequantizer 1824 likely will possess coding errors when compared to the input pixel blocks s presented to the pixel block coder 1710 of the encoder (FIG. 17).

The adder 1828 may invert operations performed by the subtractor 1710 (FIG. 17). It may receive a prediction pixel block from the predictor 1870 as determined by prediction references in the coded video data stream. The adder 1828 may add the prediction pixel block to reconstructed residual values output by the inverse transform unit 1826 and may output reconstructed pixel block data.

As described, the frame buffer 1830 may assemble a reconstructed frame from the output of the pixel block decoder 1820. The in-loop filter 1840 may perform various filtering operations on recovered pixel block data as identified by the coded video data. For example, the in-loop filter 1840 may include a deblocking filter, a sample adaptive offset ("SAO") filter, and/or other types of in loop filters. In this manner, operation of the frame buffer 1830 and the in loop filter 1840 mimic operation of the counterpart frame buffer 1730 and in loop filter 1740 of the encoder 1700 (FIG. 17).

The reference picture buffer 1850 may store filtered frame data for use in later prediction of other pixel blocks. The reference picture buffer 1850 may store decoded frames as it is coded for use in intra prediction. The reference picture buffer 1850 also may store decoded reference frames.

The virtual reference picture generator 1860 may generate virtual reference frames. The virtual reference picture generator 1860 may include a virtual reference picture predictor 1862 and a virtual reference picture buffer 1864. The virtual reference picture predictor 1862 may generate virtual reference frames according to the techniques discussed herein with respect to any of FIGS. 3-16. The virtual reference picture predictor 1862 may generate the virtual reference frames from reference frames stored in the reference picture buffer 1850. The virtual reference picture buffer 1864 may store the virtual reference frames so generated for use in prediction by the predictor 1870.

When performing prediction searches within virtual reference frames stored in the virtual reference frame buffer 1864, the predictor 1870 may perform direct motion projection and temporal motion projection as described hereinabove.

As discussed, the predictor 1870 may supply the prediction blocks to the pixel block decoder 1820 according to a coding mode identified in the coded video data. The predictor 1870 may supply predicted pixel block data as determined by the prediction reference indicators supplied in the coded video data stream.

The controller 1880 may control overall operation of the coding system 1800. The controller 1880 may set operational parameters for the pixel block decoder 1820 and the predictor 1870 based on parameters received in the coded video data stream. As is relevant to the present discussion, these operational parameters may include quantization parameters for the dequantizer 1824 and transform modes for the inverse transform unit 1810. As discussed, the received parameters may be set at various granularities of image data, for example, on a per pixel block basis, a per frame basis, a per slice basis, a per LCU/CTU basis, or based on other types of regions defined for the input image.

As discussed, oftentimes, an encoder 1700 (FIG. 17) may refrain from providing signaling representing a virtual reference frame until its predictor 1770 selects a virtual reference picture for use in prediction of an input pixel block. Thus, the contents of a decoder's virtual reference picture buffer 1864 need not be synchronized with those of an encoder's virtual reference buffer 1764 (FIG. 17). In this manner, the virtual reference picture buffer 1864 can be implemented using an "on-the-fly" principle, where virtual reference frames are generated only when needed. This would not require a dedicated full frame of the buffer. More specifically the on-the-fly approach will result in the generation of the corresponding DMVP blocks after parsing the bitstream syntax and based on the indication whether a coded block will use the block from the DMVP frame as a reference or not. This can reduce resource requirements in practical decoder implementations such as for high resolution video (such as 8 k) by reducing memory and complexity requirements of decoders.

In an embodiment, based on the DMVP interpolation technique, a temporal interpolated prediction mode, signaled as "TIP_mode," can be created. The TIP_mode may indicate how virtual reference frames are to be used by a decoder.

For example, when TIP_mode is 0, it may indicate that the virtual reference frame will NOT be directly output for displaying. It may indicate that, instead, the virtual reference frame will be used as an additional reference frame of another coded frame. The encoding/decoding procedure will be conducted to reconstruct/decode the coded frame. The coded frame will be compressed and sent in the bitstream.

Continuing with this example, when TIP_mode is 1, it may indicate that the virtual reference frame will be directly output from the decoder for displaying. The virtual reference frame will be used as the reconstructed/decoded frame of current coding frame. This indication also may indicate that the coded video bitstream has no other information sent for reconstructing/decoding the coding frame.

Further under this example, when TIP_mode is 2, it may indicate that some side information is sent in the bitstream to help the decoder to improve the quality of the virtual reference frame before it is output for display. It is expected that in practice, this side information will be much less than would be created in the full encoding/decoding procedure when TIP_mode is 0. For example, the residual between the virtual reference frame and the source frame, motion information, partition, transform information, filtering information, noise information, film grain model information, and so on, can be selected, compressed, and sent in the bitstream. With this side information, the coding frame need not go through the full normal encoding/decoding procedure as that in TIP_mode is 0.

In all these modes, additional information can be sent to the decoder to indicate to create a new TIP virtual reference frame/region or reuse existing TIP virtual reference frame/region from previous coding frame.

In all these modes, additional information can be sent to the decoder to indicate how or help to create the virtual reference frame/region.

In particular embodiments, loop filters can be applied or disabled on the virtual reference frame based on the applications and resources.

The above TIP technique that exploits DMVP techniques can be extended to the tile, slice, or region level. An entire tile, slice, or region can be signaled and then predicted using different TIP modes. If the tile, slice, or region is coded using TIP_mode equal to 1, the samples of the entire tile or region can be copied directly from the interpolated virtual reference frame.

In an embodiment, region-based inter prediction, called "advanced inter prediction" for convenience, may be performed using DMVP techniques. A region can be a frame, tile, slice, another predefined rectangular or arbitrary region (commonly larger than a coding block such as a coding tree unit, macroblock, or a superblock; such a region is usually a collection of such block units) that is specified by other syntax elements. In this advanced inter prediction mode, an encoder may indicate, using syntax elements in the header of a collection of frames, a frame, slice, tile, or region, what type of inter prediction could be utilized for predicting this frame/slice/tile/region, which could vary in terms of its method of generation and signaling overhead, as well as whether additional information, such as residuals are associated with such a frame/slice/tile/region. In a particular embodiment, such a frame/slice/tile/region could be indicated to have three different modes, a "full_skip," "semi_skip," and "no_skip" modes, again, for convenience. Other modes could be introduced as may be desired. Although the following discussion refers to this process operating on a frame, the principles discussed herein can be applied different granularity (collection of frames, at a slice or tile level etc.) within a coding sequence. These modes permit such regions to be coded while exploiting different tradeoffs between the complexity of different sub-units of a video encoder or decoder and coding performance.

Consider a coding application where the three modes discussed above are available. When a coded frame is in full_skip mode, then the prediction of the current frame may be performed using the exact same described earlier for the virtual reference frame. Instead of generating a virtual reference frame only for prediction, as discussed above, the virtual reference frame also may be an output of the decoding process and can be stored in the decoded picture buffer. This frame could also be further tagged as being a no show/display frame, as supported in various specifications. For this frame, no additional information needs to be sent in the bitstream, e.g. no residuals, making it very efficient to decode both in terms of complexity (only motion prediction needs to be performed) and bitrate. Other operations such as loop-filtering may be skipped or still applied on such frames.

When a coded frame is signaled to be in the no_skip mode, the coded frame may be coded using conventional coded methods and motion information per block as well as residual data also may be signaled.

When a coded frame is signaled to be in the semi_skip mode, although all motion information for the frame is directly derived and not signaled, some additional information can be sent in the bitstream, which could help in the reconstruction process of the current frame. For example, the residual between the DMVP frame and the source frame as well as parameters that may control loop-filtering and film grain model parameters can also be included in the frame header and signaled in the bitstream.

In particular embodiments, loop filters can be used with such advanced prediction coded frames based on the current application and\or available resources.

The motion projections of the TMVP or DMVP modes may be created using pixel blocks from different reference frames or discontinuous blocks. This may cause discontinuities around the pixel block boundaries after motion compensation. To remove blocking artifacts and provide good prediction quality, a deblocking filter can be applied to the boundary of each pixel block unit in the virtual reference frame. The filtering strength or method to be used can be decided based on the reference frames used, and/or the differences in the motion vectors and weighted prediction parameters (if considered) between the adjacent blocks.

Similar considerations could be made for other loop filters. For example, the SAO or CCSO can also be applied to reduce ringing artifacts and/or improve quality by classifying the samples in the region of virtual reference frame, then adding an offset to each sample based on its category.

When a virtual reference frame is used as a reference frame during coding of an input pixel block, different in-loop filter strategies can be applied to the current frame to improve its quality. If the reference for one block is the virtual reference frame and if a neighboring block is not using the virtual reference frame, regardless if the virtual reference frame itself is using that same reference, then the decoder can decide to use a particular "deblocking filter" strength or filtering method that is intended for blocks that utilize different references for prediction. If the neighboring blocks both utilize the DMVP prediction, then only the corresponding motion vectors and illumination parameters could be considered. This may make it easier maybe from a memory management. In the alternative method, the virtual reference frame is "deconstructed" into the actual references and the motion information is completely computed. In this case the deblocking process can evaluate the actual references and motion information used for prediction when performing any in-loop filter operations. This can be far more accurate and can improve the loop filtering process, although at a cost of higher complexity.

Signaling data may be defined at the frame or tile level in a coding protocol to indicate which method(s) are selected.

As discussed, the DMVP techniques described above find application when motion between reference frames is translational motion. However, some video sequences could include complex motion, like affine, which includes rotation, zoom, and deformable motion. In cases of affine and deformable motion, a coder may determine not to apply DMVP techniques. An encoder may signal the DMVP mode at the block level (for example, using a field "enable_dmvp"). Other embodiments, however, provide techniques to signal the DMVP mode in a flexible and adaptive manner, which and avoid the performance loss introduced by the DMVP mode in complex motion cases.

In one embodiment, the enable_dmvp flag can be signaled at a slice, tile, or even video or frame level. For example, this information could be signaled in the video parameter set (VPS), sequence parameter set (SPS), picture parameter set (PPS), picture, tile, or slice headers of an HEVC or VVC like standard or technology. In this case the decoder will assume that the enable_dmvp flag is on or off for the entire video, frame, or sub-frame that is being coded.

In another embodiment, the enable_dmvp flag can be signaled at lower level unit, such as a region/collection of blocks, or at the coding block/unit level.

In a further embodiment, the enable_dmvp flag can be signaled separately for different frames/slices and blocks. For instance, depending on the frame or slice characteristics, the enable_dmvp flag can be signaled as in the prior two paragraphs for that particular frame/slice/tile.

In another embodiment, the enable_dmvp flag can be signaled based on the selected coding modes and parameters in the neighboring blocks/slices/tiles. For example, a coding block/slice/tile can use the information from the above or left neighboring blocks/tiles/frames and/or with information on the current block/slice/tile/frame to either infer the enable_dmvp flag without signaling it or use this information to signal the enable_dmvp flag more efficiently by using separate entropy coding contexts depending on neighboring blocks information. In the case of slices and tiles, the last coding block of the neighboring slices/tiles can be used.

In a further embodiment, if a tile, slice, or a super block contains multiple smaller coding blocks (e.g. 4 sub coding blocks within a coding tree unit or slice/tile) then the enable_dmvp flag can be signaled for only one of the coding blocks, for example for the first sub-block, and other sub-blocks within the tile, slice or a super block can infer the enable_dmvp flag value from the neighboring coding blocks.

In another embodiment, in case of separate coding trees for luma and chroma channels (e.g. similar to dual-tree in the H.266/VVC coding standard), the enable_dmvp flag can be signaled for luma coding blocks and can be inferred for chroma blocks from the collocated luma blocks. In an alternative design they can be signaled separately and the context derivation for entropy coding can be based on the color component.

In a further embodiment, the enable_dmvp flag can be signaled at the block level to ensure block-level control of DMVP and can be simultaneously controlled also at higher levels such as in the video or frame/slice level, VPS (video parameter set), SPS (sequence parameter set) or PPS (picture parameter set) layers. In this case, the condition to signaling the enable_dmvp flag at the block level would also depend on the higher level flags. If the higher level video or frame/slice level, VPS, SPS or PPS flag is 0, then all the lower block level enable_dmvp flags would be inferred as 0. If the higher level flag is 1, then the encoder can decide on the value of enable_dmvp on a per-block basis. The control at the higher level would ensure that for specific video content and/or for certain frames, where DMVP would not be beneficial, if the signaling of enable_dmvp at the block can be turned off to minimize signaling overhead.

In another embodiment, for complex and more efficient algorithms, like the on-the-fly update, affine transformation model, acceleration, multiple hypothesis prediction, the enable_dmvp can be signaled as a parameter at the block level. This can help to ensure that block-level control can adaptively switch between different modes based on the features and statistics of the current block so that the corresponding blocks in the DMVP frame can be interpolated with an affine transformation model or multiple hypothesis prediction based on the content feature of the block. This can improve the video quality of the DMVP frame and reduce the prediction residual. The enable_dmvp parameter of DMVP can be simultaneously controlled also at higher levels such as in video or frame/slice level, VPS, SPS or PPS layers. The highest level can permit the maximum number of possible values, but then the lower levels can only allow a subset of the permitted possible values from a higher level. For example, N possible values of enable_dmvp parameters could be permitted in the SPS, which indicates the number of possible modes or mode groups that can be permitted at a lower layer, then in the PPS it could refine the number of possible modes even further (e.g., M possible options out of N), moving down to the block level where the option could be, for example, a flag. This hierarchical layer structure of signaling the enable_dmvp parameter can improve the signaling efficiency.

As mentioned above, a virtual reference frame will be used in video coding in addition to coded input frames that are designated as reference frames (e.g., those stored in the reference picture buffers 1750 (FIG. 17) and 1850 (FIG. 18)). And since the interpolated frame is already blended from one forward and one backward reference frame, it is temporally aligned with coded input frame(s) to a certain degree. Therefore, a virtual reference frame can be used for single prediction. If the reference block of the current encoding block is from the virtual reference frame, this prediction mode is called DMVP mode, as one alternative to the inter prediction modes available. More complex and efficient prediction mode can be constructed by using one predictor from the DMVP frame and another one from other reconstructed reference frames. Then this would create a $b_i$-predicted frame using the DMVP frame and the other reference frames. In this case triple or higher level hypothesis prediction could be utilized since the DMVP frame is originally generated using two reference frames. This can provide better prediction and reduce the prediction residual.

Select of a DMVP mode may be performed in a variety of ways at different levels of a coding syntax.

In one embodiment, the selection scheme can be selected based on the frame/slice/tile type, for example, intra or inter frame/slice/tile. The enable_dmvp may be turned off for an intra frame/slice/tile.

In another embodiment, the scheme can be selected based on the number of available reference frames. The enable_dmvp flag may be turned off if there is only one available reference frame. However, the scheme can use more than two reference frames, which could use more reference frames that are previously decoded to form a better prediction.

In a further embodiment, the scheme can be selected based on the signal statistics of the content of a frame, slice, tile, region, or super block. For example, the enable_dmvp flag may be turned off if the majority of the motion types in the frame indicate affine motion and deformable motion.

In another embodiment, the scheme can be selected based on other than the current coding block's signal statistics, for example, the characteristics of the current block's spatial or temporal neighboring blocks.

In a further embodiment, the scheme can be selected separately for different frames/slices/tiles and blocks. For instance, depending on the frame or slice characteristics, the enable_dmvp flag can be turned on for the particular frame/slice/tile. However, a different slice/tile/frame can turn it off.

In another embodiment, the scheme can be selected at a block level based on rate distortion optimized (RDO) decisions if the enable_dmvp flag is not turned off at a higher level syntax. For example, as shown in FIG. 14, the DMVP mode is signaled after the inter or intra mode flag and before a conventional single/compound inter prediction. It can also be signaled before a skip flag, based on statistical analysis, if large quantities of the DMVP mode are selected so that it can save some bits to signal a skip and inter-intra mode.

In a further embodiment, for complex and more efficient algorithms, like the on-the-fly update, affine transformation model, acceleration, multiple hypothesis prediction, etc., then the enable_dmvp parameter can be signaled as a non-binary parameter at the block level to ensure that block-level control can adaptively switch between different modes based on the feature and statistics of the current block so that the corresponding blocks in the DMVP frame can be interpolated with the affine transformation model or multiple hypothesis prediction based on the content feature of the block. This can improve the video quality of the DMVP frame and reduce prediction residual.

As discussed above, a frame, tile, slice or region could be coded using a temporal interpolated mode that utilizes the DMVP process. In an embodiment, an encoder may signal a TIP_mode value that indicates coding decisions made by an encoder.

In an embodiment the TIP_mode can indicate 3 states, for example, as follows:

TABLE 1

| TIP Mode | Meaning |
| --- | --- |
| 0 | A decoder shall use a virtual reference frame as an additional reference frame, normally coding current frame |
| 1 | A decoder shall directly output DMVP frame for display. The encoder is not providing separate coding of the current frame |
| 2 | With some additional side information, the decoder will output the enhanced DMVP frame based on the side information. |

Additional syntax elements can be included within a signaling protocol to provide other types of information. For example, syntax elements can also be defined to indicate whether loop filters could be applied to the current frame, or syntax elements can also be defined to indicate whether to create a new TIP virtual reference frame/region or reuse existing TIP virtual reference frame/region from previous coding frame.

A TIP mode indicator, TIP_mode, can be represented in a signaling protocol in a variety of ways.

In one embodiment, the TIP_mode indicator can be signaled at a slice, tile, or even video or frame level. For example, this information could be signaled in the video parameter set (VPS), sequence parameter set (SPS), picture parameter set (PPS), picture, tile, or slice headers of an HEVC or VVC like standard or technology. In this case the decoder will assume that the TIP_mode flag is determined for the entire video, frame, or sub-frame that is being coded.

In another embodiment, the TIP_mode indicator can be signaled at lower level unit within a signaling protocol, such as a region/collection of blocks, or at the coding block/unit level.

In a further embodiment, the TIP_mode indicator can be signaled separately for different frames/slices and blocks. For instance, depending on frame or slice characteristics, the TIP_mode indicator can be signaled as in the prior two paragraphs for that particular frame/slice/tile.

In another embodiment, the TIP_mode indicator can be signaled based on the selected coding modes and parameters in the spatial or temporal neighboring blocks/slices/tiles. For example, a coding block/slice/tile can use the information from the above or left neighboring blocks/tiles/frames and/or with information on the current block/slice/tile/frame to either infer the TIP_mode indicator without signaling it or use this information to signal the TIP_mode indicator more efficiently by using separate entropy coding contexts depending on neighboring blocks information. In the case of slices and tiles, the last coding block of the neighboring slices/tiles can be used.

In a further embodiment, in an application that employs separate coding trees for luma and chroma channels, the TIP_mode indicator can be signaled for the luma channel and can be coded or inferred for the chroma channels based on previous coded information. In an alternative design they can be signaled separately and the context derivation for entropy coding can be based on each color component.

In another embodiment, the TIP_mode indicator can be signaled at a tile or region level to ensure fine grain control of the TIP mode and can be simultaneously controlled also at higher levels such as in the video or frame/slice level, VPS, SPS or PPS layers. In this case, the condition to signaling the TIP_mode indicator at a tile or region level would also depend on the higher level syntax. For example, if the higher level video or frame/slice level, VPS, SPS or PPS corresponding syntax is 0, then all the lower tile or region level TIP_mode indicators would be inferred as 0. If the higher level corresponding syntax is 1, then the encoder can decide on the value of TIP_mode on a tile or region basis. The control at the higher level would ensure that for specific video content and/or for certain frames.

As mentioned, a frame, tile, slice or region could be coded predictively using the DMVP process.

In an embodiment, a signaling protocol may include syntax elements in the current frame, slice, tile, and/or region header to indicate an applied coding mode. For example a coding mode may indicate one of three modes, called a "no_skip," "semi_skip," or "full skip" mode, respectively, as follows:

TABLE 2

| Mode | Name | Meaning |
| --- | --- | --- |
| 0 | No_Skip | "Normal" coding of the current frame, that includes both block level motion information and residuals |
| 1 | Semi_Skip | The current frame is first predicted using the DMVP process. Additional information, such as coded residuals and other control parameters, such as loop filter (deblocking, SAO, ALF, etc.) and film grain parameters, could be signaled and are utilized for the reconstruction of the final frame. |
| 2 | Full_Skip | The current frame is predicted using the DMVP process and output without any additional residual information being decoded and utilized. Loop-filtering may optionally be supported. |

Moreover, the signaling protocol may include other syntax elements to indicate whether loop filters could be applied to the current frame.

For the Semi_skip and Full_skip modes, additional parameters could also be signaled that could control how the DMVP process is performed. For example, a parameter may be used to indicate the process that should be used for filling holes, while another parameter may dictate that only a single motion vector should be generated per block or pixel, the granularity of the blocks, or whether the motion model that is used could be using a constant velocity or an acceleration based motion model.

Signal the prediction mode type of a region, referred to here as "advanced_prediction_mode" indicator, may occur in a variety of ways.

In one embodiment, the advanced_prediction_mode indicator can be signaled at a slice, tile, or even group of frames, video, or frame level. For example, this information could be signaled in the video parameter set (VPS), sequence parameter set (SPS), picture parameter set (PPS), picture, tile, or slice headers of an HEVC or VVC like standard or technology. In this case the decoder will assume that the advanced_prediction_mode syntax element is determined for the entire video, frame, or sub-frame that is being coded.

In another embodiment, the advanced_prediction_mode indicator can be signaled at a lower level unit, such as a region/collection of blocks, or at the coding block/unit level.

In a further embodiment, the advanced_prediction_mode indicator can be signaled separately for different frames/slices and blocks. For instance, depending on the frame or slice characteristics, the advanced_prediction_mode indicator can be signaled as in the prior two paragraphs for that particular frame/slice/tile.

In another embodiment, the advanced_prediction_mode indicator can be signaled based on the selected coding modes and parameters in the spatial or temporal neighboring blocks/slices/tiles. For example, a coding block/slice/tile can use the information from the above or left neighboring blocks/tiles/frames and/or with information on the current block/slice/tile/frame to either infer the advanced_prediction_mode indicator without signaling it or use this information to signal the advance_prediction_mode indicator more efficiently by using separate entropy coding contexts depending on neighboring blocks information. In the case of slices and tiles, the last coding block of the neighboring slices/tiles can be used.

In a further embodiment, when separate coding trees for luma and chroma channels are employed, the advanced_prediction_mode indicator can be signaled for the luma channel and can be coded or inferred for the chroma channels based on previous coded information. In an alternative design they can be signaled separately and the context derivation for entropy coding can be based on the color components.

In another embodiment, the advanced_prediction_mode indicator can be signaled at a tile or region level to ensure fine grain control of the advanced prediction mode and can be simultaneously controlled also at higher levels such as in the video or frame/slice level, VPS, SPS or PPS layers. In this case, the condition to signal the advanced_prediction_mode indicator at a tile or region level would also depend on the higher level syntax. For example, if the higher level video or frame/slice level, VPS, SPS or PPS corresponding syntax is 0, then all the lower tile or region level advanced_prediction_mode indicators would be inferred as 0. If the higher level corresponding syntax is 1, then the encoder can decide on the value of advanced_prediction_mode on a tile or region basis. The control at the higher level would ensure optimal adaptation of this mode for specific video content and/or for certain frames.

DMVP prediction modes have been described thus far as applied to single prediction. However it can be extended to a uni-directional compound mode, b,-directional compound mode, inter-intra compound mode, and skip mode to further reduce temporal redundancy and improve compression efficiency.

DMVP prediction modes have been described thus far as applied when one forward (past) reference frame and one backward (future) reference frame are available, and by conducting motion vector projection through interpolation. However it can be extended to uni-directional inter prediction where only one side of reference frames are available. The motion vector can be projected through extrapolation.

As discussed, by exploiting previously-coded motion information to interpolate a virtual reference frame that is temporally close to the current frame, the interpolated frame can be used for prediction of a current input frame and can reduce the temporal redundancy to improve coding efficiency.

As discussed, by signaling the enable_dmvp parameter at different levels (e.g. tile/slice/frame/video and picture level, block level), a coding system may have more flexibility and be able to better adapt to different environments and applications. For example, in some applications, the majority of the motion types between frames could be translational motion, and signaling the enable_dmvp parameter with the translational model can provide better coding performance. However in some of the sequences, which may include lots of non-translational motion, like affine/zoom in/zoom out/ scaling etc., utilizing the affine transformation model to generate the DMVP frame or block can provide better coding performance. Therefore the signaling of enable_dmvp can include the affine transformation model. In alternative embodiments, additional models such as for dealing and signaling the derivation of a multiple hypothesis prediction that uses more than 2 references for prediction, can provide better coding performance, and can be included in the enable_dmvp parameters that could be signaled. Furthermore, in another embodiment, if the entire frame or tile has the same transformation model, then allowing the signaling of the enable_dmvp parameter at the frame or tile level can help reduce the signaling overhead at the block level. Similarly, if consecutive frames include the same transformation model, then the transformation model can be signaled at the SPS or PPS level to further reduce the signaling overhead. Meanwhile, to provide more flexibility, an adaptive hierarchical solution can be provided by allowing the maximum number of possible values at the high level, then at the lower level only a subset of the permitted possible values from the immediate higher level may be permitted. For example, if N possible values of enable_dmvp parameters are permitted at the SPS, which indicates the maximum number of possible modes or mode groups that can be permitted at a lower layer, then in the PPS the number of possible modes could be limited further (M possible options out of N). this could be continued even down to the block level where the option could even be a flag or inferred if at a higher level already the limitation reached to one possible mode. This hierarchical layered structure of signaling enable_dmvp parameter can improve the signaling efficiency.

As discussed above, a TIP frame may be generated by utilizing existing motion vectors from previously-coded frames that are available both on the encoder and the decoder. It is expected that the TIP frame often will be better aligned temporally with a current frame to be coded than isolated reference frames and, therefore, may provide a better prediction candidate for the current frame. Thus, when an encoder provides a TIP frame as an additional reference frame (tip_frame_mode=1 mode) and uses the TIP frame as a prediction reference for a pixel block of a current frame, the values of the pixel blocks' motion vectors generated from the TIP reference frame after motion estimation (ME) often tend to be zero or close to zero. With this prior information, coding of the pixel block may be performed more efficiently than using the Motion Vector Difference (MVD) based motion signaling discussed above.

Figure 19:
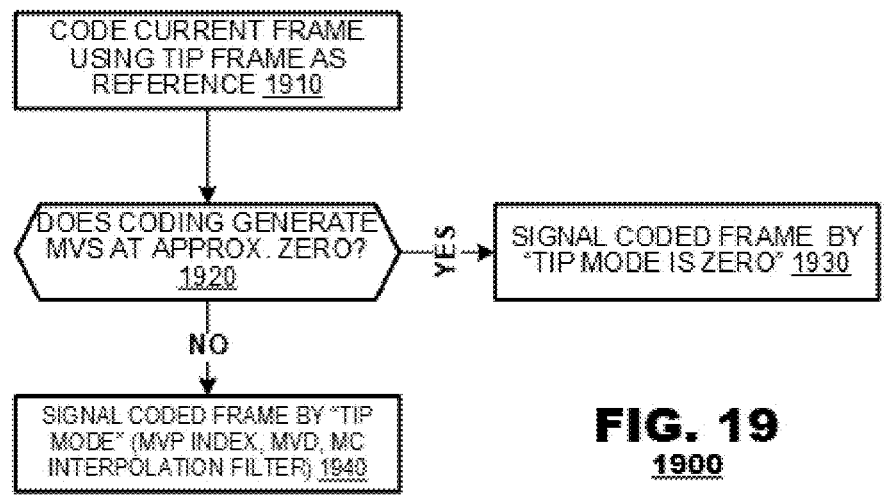
FIG. 19 a method of signaling coding information according to an embodiment of the present disclosure.

FIG. 19 a method 1900 of signaling coding information according to an embodiment of the present disclosure. The method 1900 may begin when an encoder codes a current frame using a TIP frame as a reference frame. It is determined whether the coding generates motion vectors that have values that are approximately zero (box 1910). If so, the method 1900 may communicate coding of the current frame using signaling that indicates the frame is coded as a TIP frame with zero-valued motion vectors (box 1930). If not, the method 1900 may communicate coding of the current frame using signaling that indicates the frame is coded using the TIP coding technique and providing additional data that includes values of motion vectors (such as by a motion vector prediction index and motion vector delta values, and motion compensation interpolation filter identifiers).

As an example, the signaling provided in box 1930 may include a syntax element, called zero_mv, to indicate if the MV of the block indicated as a TIP mode block is zero. In the encoder, the encoder sets and signals the syntax zero_mv element to be equal to 1 if the value of TIP MV is zero, and no other syntax elements related to MV signaling need to be signaled. If the value of TIP MV is non-zero, then existing syntax elements related to MV signaling need to be signaled. With this new signaling method of TIP MV, a considerable amount of signaling overhead can be saved when TIP MV is zero.

The techniques of FIG. 19 may apply to coded data that have motion vectors that are not strictly zero. In some coding application, encoders may truncate motion vectors that have relatively low values to zero. For example, when the magnitude of the motion vector of TIP mode is near zero, for example, if motion vector is within +−1 integer sample, the encoder can decide to quantize it to the integer 0 value, then use the zero_mv flag to save signaling overhead.

Figure 20:
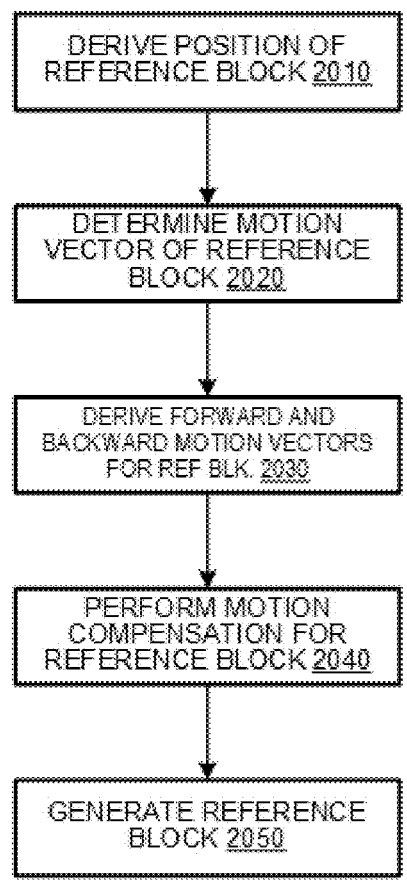
FIG. 20 shows a method of generating TIP frames according to an embodiment of the present disclosure.
Figure 21:
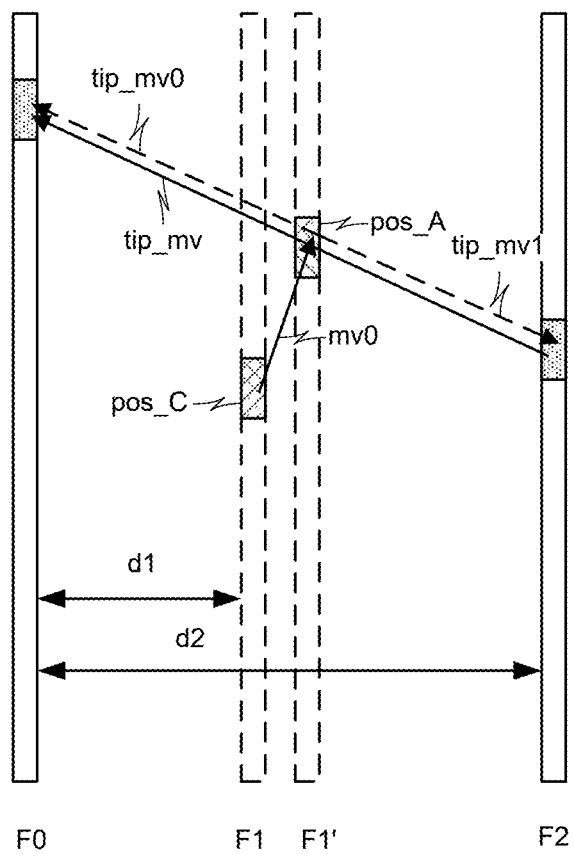
FIG. 21 illustrates an exemplary coding scenario according to an embodiment of the present disclosure.

In embodiment, coding operations may constrain motion vector ranges to simplify application in hardware environments. FIG. 20 shows a method 2000 that finds application in an environment where TIP frames are generated on an on-the-fly basis and FIG. 21 illustrates application of the method 2000 to an exemplary coding environment. Given a position of a pixel block (pos_C) to be coded, the method may derive a position (pos_A) of a reference frame to serve as a prediction reference (box 2010) using a motion vector (mv_0). The method may determine a motion vector (tip_mv) that generates content of the reference block (pos_A) (box 2020). The method may derive forward and backward motion vectors (tip_mv0, tip_mv1) for the reference block (pos_A) (box 2030). The method may perform motion compensation for the reference block (pos_A) using the forward and backward motion vector (box 2040) and, thereafter, generates the reference block (box 2050).

Hardware implementations may incur additional processing expense when large ranges of motion vectors (MVO) are used, since they may result in a significant motion vector fetching and storing cost increase. In application, the value of MVO can be normatively limited within a range around the current block. With this constraint, a decoder only needs to fetch a small local range (e.g. +/−4 TMVP units) around the current block, which can reduce cost and complexity considerably.

In another aspect, the foregoing prediction techniques may be improved in cases of non-translational motion in image data. Video sequences commonly include complex motion, such as zoom, rotation, scaling etc., and may involve more complex motion modeling such as an affine motion model, an acceleration based motion model, etc. Prediction models that employ linear motion modeling when generating a TIP frame can create coded pixel residual that may be quite large when using tip_frame_mode=2 (directly output TIP frame as current frame and without coding current frame), and both the coding pixel residual and the signaling overhead of motion vectors from coding block to TIP frame may be large in tip_frame_mode=1 (TIP frame is used as an additional reference). In such cases, versatile motion refinement algorithms (for example, use of optical flow, affine, parametric, parabolic, high order motion considering acceleration etc.) can be applied to refine the TMVP projected motion field to generate a better quality TIP frame.

Figure 22:
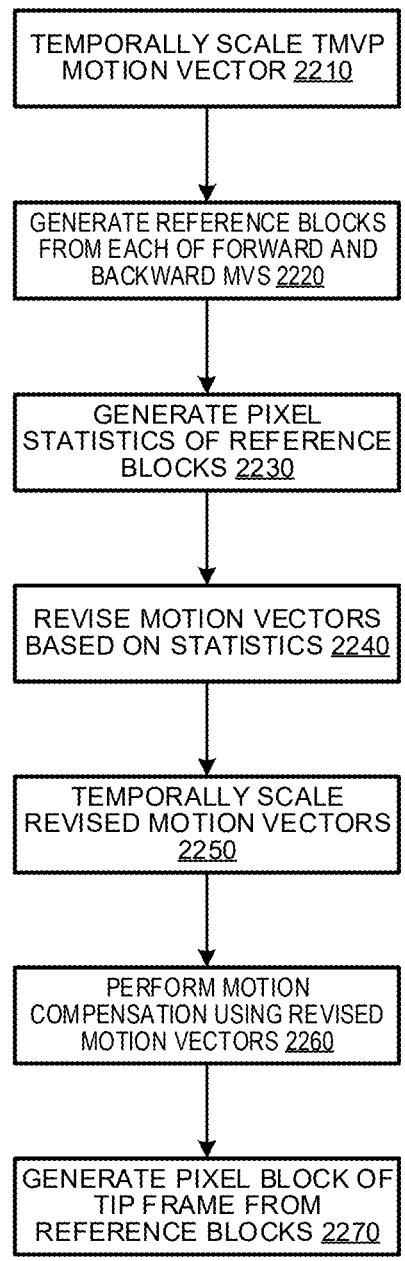
FIG. 22 illustrates a method of coding video according to an embodiment of the present disclosure.
Figure 23:
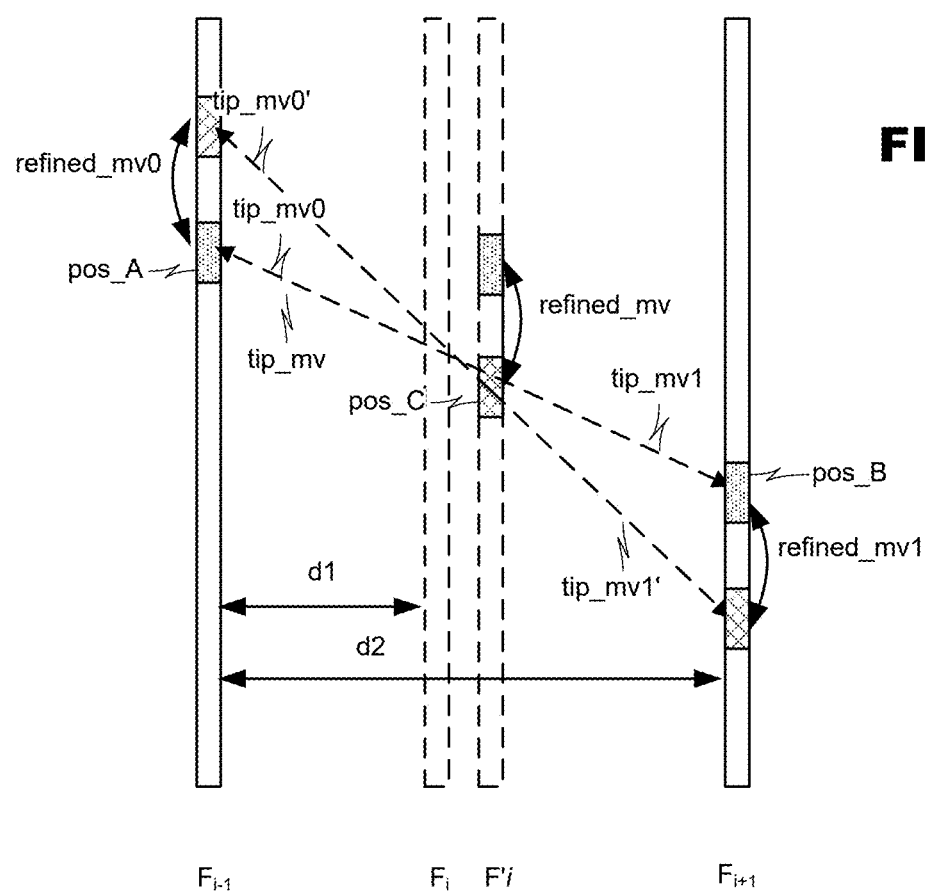
FIG. 23 illustrates an exemplary coding scenario according to an embodiment of the present disclosure.

FIG. 22 illustrates a method 2200 of coding video according to an embodiment of the present disclosure, and FIG. 23 illustrates application of the method 2200 to an exemplary coding scenario. The method 2200 may operate on a TMVP motion vector (tip_mv) for a block to be coded. The method 2200 may temporally scale the TMVP motion vector (tip_mv) and derive TMVP motion vectors that correspond to both reference frames (tip_mv0/tip_mv1) (box 2010). The method 2200 may generate reference blocks (ref_block0/ref_block1) by motion compensation using forward and backward motion vectors (tip_mv0/tip_mv1) (box 2220). The method 2200 may generate pixel statistics of the reference blocks (ref_block0/ref_block1) with a motion refinement algorithm such as by like mean, variance, gradients, correlation, and the like (box 2230). The method 2200 may derive a revised motion vector (refined_mv), for each pixel block based on the computed pixel statistics (box 2240). The method 2200 may temporally scale the revised motion vector (refined_mv) for each block to derive the corresponding fine-tuned motion vectors for both of the reference frames (refined_mv0/refined_mv1) (box 2250). The method 2200 may perform motion compensation using each of the refined motion vectors (tip_mv0'/tip_mv1') to obtain respective reference blocks (ref_block0'/ref_block1') (box 2260). The method 2200 may generate a final block for the TIP frame from the reference blocks (ref_block0'/ref_block1') (box 2270).

In an example, an optical flow refinement algorithm can be used to derive the fine-tuned motion vector, refined_mv. This algorithm assumes the intensity value of pixels along the motion trajectory in a video is constant, which is so called iso-intensity constraint. It can be expressed by $$0 = \frac{dI}{dt} \quad (32)$$

where I(x, y, t) is current block luma pixel value in position (x, y) at time t. The iso-intensity constraint can also be expressed by $$0 = \frac{dI}{dt} = \frac{\partial I}{\partial t} + \text{refined\_mv}_x \frac{\partial I}{\partial x} + \text{refined\_mv}_y \frac{\partial I}{\partial y} \quad (33)$$

Assume two reference blocks in position (x, y) are ref_block0 and ref_block1 respectively. For brevity, the position (x, y) index will be omitted below. The refined_mv can be derived from the pixel value and the statistics by solving equation (33):

$$\text{refined\_mv}_x = \frac{\sum_{(x,y)\in\Omega} G_t G_y \sum_{(x,y)\in\Omega} G_x G_y - \sum_{(x,y)\in\Omega} G_t G_x \sum_{(x,y)\in\Omega} G_y^2}{\sum_{(x,y)\in\Omega} G_x^2 \sum_{(x,y)\in\Omega} G_y^2 - \left(\sum_{(x,y)\in\Omega} G_x G_y\right)^2} \quad (34)$$

$$\text{refined\_mv}_y = \frac{\sum_{(x,y)\in\Omega} G_t G_x \sum_{(x,y)\in\Omega} G_x G_y - \sum_{(x,y)\in\Omega} G_t G_y \sum_{(x,y)\in\Omega} G_x^2}{\sum_{(x,y)\in\Omega} G_x^2 \sum_{(x,y)\in\Omega} G_y^2 - \left(\sum_{(x,y)\in\Omega} G_x G_y\right)^2} \quad (35)$$

Where d1 is the distance between current frame and reference frame that includes ref_block0, d2 is the distance between the reference which includes ref_block0 and the reference which includes ref_block1.

$$G_t = \text{ref\_block0} - \text{ref\_block1} \quad (36)$$

$$G_x = d_1 \frac{\partial \text{ref\_block0}}{\partial x} + (d_2 - d_1) \frac{\partial \text{ref\_block1}}{\partial x} \quad (37)$$

$$G_y = d_1 \frac{\partial \text{ref\_block0}}{\partial y} + (d_2 - d_1) \frac{\partial \text{ref\_block1}}{\partial y} \quad (38)$$

The above method is one of the methods to derive the refined motion. However, the refinement method is not limited to this one.

When the optical flow refinement algorithm is employed, temporal scaling of the revised motion vector (refined_mv) for each block to derive the corresponding revised motion vectors, refined_mv0/refined_mv1 can performed as:

$$\text{refined\_mv0}_x = d_1 * \text{refined\_mv}_x \quad (39)$$

$$\text{refined\_mv0}_y = d_1 * \text{refined\_mv}_y \quad (40)$$

$$\text{refined\_mv1}_x = (d_2 - d_1) * \text{refined\_mv}_x \quad (41)$$

$$\text{refined\_mv1}_y = (d_2 - d_1) * \text{refined\_mv}_y \quad (42)$$

When the optical flow refinement algorithm is employed, revised motion vectors tip_mv0'/tip_mv1' may be derived as $$\text{tip\_mv0'}_x = \text{tip\_mv0}_x + \text{refined\_mv0}_x \quad (43)$$

$$\text{tip\_mv0'}_y = \text{tip\_mv0}_y + \text{refined\_mv0}_y \quad (44)$$

$$\text{tip\_mv1'}_x = \text{tip\_mv1}_x - \text{refined\_mv0}_x \quad (45)$$

$$\text{tip\_mv1'}_y = \text{tip\_mv1}_y - \text{refined\_mv0}_y \quad (46)$$

The foregoing description describes processes of generating blocks for TIP frames. In the examples discussed above, the blocks have been assumed to be pixel blocks of regular sizes (e.g., N×N), but the principles of the present disclosure find application to pixel blocks that are not regularly-shaped. The principles of the present disclosure find application with pixel blocks that are not square (e.g., N×M pixel blocks), that have adaptively sized partitions, or have non-regular geometric shapes. For example, partitions may be defined by a segmentation algorithm.

The foregoing discussion has described operation of the aspects of the present disclosure in the context of video coders and decoders, such as those depicted in FIGS. 1-2 and 17-18. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically include instructions stored in non-transitory physical storage media such as electronic, magnetic, and/or optically-based storage devices, where they are read by a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding method, comprising:
   predictively coding input frames,
   when a coded input frame is designated as a reference frame, decoding the coded data of the reference frame;
   storing the decoded reference frame data for use as a prediction reference of subsequently-coded input frame; and
   generating data of a virtual reference frame from a pair of stored reference frames, the generating comprising:
      for a first spatial portion of the virtual reference frame that is traversed by a first motion vector associated with one of the pair of stored reference frames, predicting content for the first spatial portion from content referenced by the motion vector, and
      for a second spatial portion of the virtual reference frame that is not traversed by any motion vector associated with the pair of stored reference frames, predicting content for the second spatial portion from content identified by a predicted motion vector for the second spatial portion;
   wherein the predictive coding of an input frame includes a prediction search from among the reference frame data and virtual reference frame data.

2. The method of claim 1, further comprising:
   when the prediction search selects the virtual reference frame, outputting to a decoder data representing the virtual reference frame and data representing the input frame predictively coded with reference to the virtual reference frame.

3. The method of claim 1, wherein when a virtual reference frame is selected by no prediction search, data representing the virtual reference frame is not output to a decoder.

4. The method of claim 1, wherein a first reference frame of the pair has a temporal position on a first side of the temporal position of the virtual reference frame, and a second reference frame of the pair has a temporal position on a second side of the temporal position of the virtual reference frame.

5. The method of claim 1, wherein, when a current pixel block of an input frame is coded predictively with respect to the virtual reference frame, a motion vector of the pixel block is derived with reference to motion vectors of other pixel blocks neighboring the current pixel block that use a common set of reference frames for prediction as the current pixel block.

6. The method of claim 1, further comprising providing data representing the virtual reference frame to a channel, including temporal interpolated mode identifier indicating a decoder usage of the virtual reference frame.

7. The method of claim 6 wherein the temporal interpolated mode identifier takes one of the following states:
   a first state indicating that the decoder shall use the virtual reference frame as a reference frame;
   a second state indicating that the decoder shall output the virtual reference frame for display, and
   a third state indicating that the decoder shall output the virtual reference frame for display enhanced by additional information supplied by an encoder.

8. The method of claim 1, further comprising providing data identifying a mode of the predictive coding of the input frame.

9. The method of claim 8, wherein the predictive coding mode information takes one of the following states:
   a No_Skip state indicating that the predictive coding generates block level motion information and residual information of coded input frame content,
   a Full_Skip state indicating that the predictive coding uses direct motion vector interpolation without use of supplementary coding data, and
   a Semi_Skip state indicating that the predictive coding uses direct motion vector interpolation and includes supplementary coding data.

10. The method of claim 1, further comprising, when a pixel block of the input frame is predictively coded with reference to the virtual reference frame and motion vectors obtained from the predictive coding are smaller than a threshold value, transmitting coded data of the pixel block with a syntax element identifying the motion vectors as having zero values.

11. The method of claim 1, further comprising, wherein the prediction search of a pixel block of the input frame is constrained to a predetermined search window about a collocated location of the virtual reference frame.

12. The method of claim 1, wherein content of the virtual reference frame is generated an optical flow motion vector refinement technique.

13. The method of claim 1, wherein the predicted motion vector is predicted from
   motion of a content element from a first one of the pair of reference frames to another reference frame, and
   motion of the content element from the other reference frame to a second one of the pair of reference frames.

14. The method of claim 1, wherein the prediction motion vector is predicted from a motion vector of a third spatial portion of the virtual reference frame proximate to the second spatial portion of the reference frame.

15. Non-transitory computer readable medium having program instruction stored thereon that, when executed by a processing device, causes the processing device to:
predictively code input frames,
when a coded input frame is designated as a reference frame, decode the coded data of the reference frame,
store the decoded reference frame data for use as a prediction reference of subsequently-coded input frame,
generate data of a virtual reference frame from a pair of stored reference frames according to:
for a first spatial portion of the virtual reference frame that is traversed by a first motion vector associated with one of the pair of stored reference frames, predicting content for the first spatial portion from content referenced by the motion vector, and
for a second spatial portion of the virtual reference frame that is not traversed by any motion vector associated with the pair of stored reference frames, predicting content for the second spatial portion from content identified by a predicted motion vector for the second spatial portion;
wherein the predictive coding of an input frame includes a prediction search from among the reference frame data and virtual reference frame data.

16. An encoding terminal, comprising:
a video encoder having an input for source video;
a video decoder having an input for coded video from the video encoder;
a reference picture buffer to store decoded reference frames output from the video decoder;
a virtual reference picture generator having an input for a pair of reference frames from the reference picture buffer and having on output for data of a virtual reference frame, wherein:
for a first spatial portion of the virtual reference frame that is traversed by a first motion vector associated with one of the pair of stored reference frames, the first spatial portion is predicted from content referenced by the motion vector, and
for a second spatial portion of the virtual reference frame that is not traversed by any motion vector associated with the pair of stored reference frames, the second spatial portion is predicted from content identified by a predicted motion vector for the second spatial portion; and
a virtual reference picture buffer having an input for virtual reference frames output by the virtual reference picture generator.

17. The terminal of claim 16, further comprising a predictor having inputs for reference frames from the reference picture buffer and for virtual reference frames from the virtual reference picture buffer.

18. The terminal of claim 16, wherein a first reference frame of the pair has a temporal position on a first side of the temporal position of the virtual reference frame, and a second reference frame of the pair has a temporal position on a second side of the temporal position of the virtual reference frame.

19. The terminal of claim 16, wherein, when a current pixel block of an input frame is coded predictively with respect to a virtual reference frame, the video encoder derives a motion vector of the pixel block with reference to motion vectors of other pixel blocks neighboring the current pixel block that use a common set of reference frames for prediction as the current pixel block.

20. A video decoding method, comprising:
predictively decoding coded frames according to coding parameters provided with the coded frames,
when a coded frame is designated as a reference frame, storing the decoded reference frame for use as a prediction reference of subsequently-decoded frames,
wherein, when coding parameters identify a coded frame as coded with reference to a virtual reference frame:
deriving content of the virtual reference frame from a pair of stored reference frames, the deriving comprising:
for a first spatial portion of the virtual reference frame that is traversed by a first motion vector associated with one of the pair of stored reference frames, predicting content for the first spatial portion from content referenced by the motion vector, and
for a second spatial portion of the virtual reference frame that is not traversed by any motion vector associated with the pair of stored reference frames, predicting content for the second spatial portion from content identified by a predicted motion vector for the second spatial portion; and
decoding the coded frame with using the virtual reference frame as a prediction reference.

21. The method of claim 20, wherein a first reference frame of the pair has a temporal position on a first side of the temporal position of the virtual reference frame, and a second reference frame of the pair has a temporal position on a second side of the temporal position of the virtual reference frame.

22. The method of claim 20, wherein, when a current pixel block of an input frame is coded predictively with respect to a virtual reference frame, a motion vector of the pixel block is derived with reference to motion vectors of other pixel blocks neighboring the current pixel block that use a common set of reference frames for prediction as the current pixel block.

23. Non-transitory computer readable medium having program instruction stored thereon that, when executed by a processing device, causes the processing device to:
predictively decode coded frames according to coding parameters provided with the coded frames,
when a coded frame is designated as a reference frame, store the decoded reference frame for use as a prediction reference of subsequently-decoded frames,
wherein, when coding parameters identify a coded frame as coded with reference to a virtual reference frame:
derive content of the virtual reference frame from a pair of stored reference frames according to:
for a first spatial portion of the virtual reference frame that is traversed by a first motion vector associated with one of the pair of stored reference frames, predicting content for the first spatial portion from content referenced by the motion vector, and
for a second spatial portion of the virtual reference frame that is not traversed by any motion vector associated with the pair of stored reference frames, predicting content for the second spatial portion from content identified by a predicted motion vector for the second spatial portion; and
decode the coded frame with using the virtual reference frame as a prediction reference.

24. A decoding terminal, comprising:
a video decoder having an input for coded video,
a reference picture buffer to store decoded reference frames output from the video decoder, a virtual reference picture generator having an input for a pair of reference frames from the reference picture buffer and having on output for data of a virtual reference frame, wherein:

for a first spatial portion of the virtual reference frame that is traversed by a first motion vector associated with one of the pair of stored reference frames, the first spatial portion is predicted from content referenced by the motion vector, and for a second spatial portion of the virtual reference frame that is not traversed by any motion vector associated with the pair of stored reference frames, the second spatial portion is predicted from content identified by a predicted motion vector for the second spatial portion; and a virtual reference picture buffer having an input for virtual reference frames output by the virtual reference picture generator.

25. The terminal of claim 24, further comprising a predictor having inputs for reference frames from the reference picture buffer and for virtual reference frames from the virtual reference picture buffer.

26. The terminal of claim 24, wherein a first reference frame of the pair has a temporal position on a first side of the temporal position of the virtual reference frame, and a second reference frame of the pair has a temporal position on a second side of the temporal position of the virtual reference frame.

\* \* \* \* \*